United States Patent
Nakamura

(10) Patent No.: US 6,628,258 B1
(45) Date of Patent: Sep. 30, 2003

(54) ELECTROOPTIC DEVICE, SUBSTRATE THEREFOR, ELECTRONIC DEVICE, AND PROJECTION DISPLAY

(75) Inventor: Junichi Nakamura, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 09/509,933

(22) PCT Filed: Aug. 3, 1999

(86) PCT No.: PCT/JP99/04195

§ 371 (c)(1),
(2), (4) Date: Jun. 22, 2000

(87) PCT Pub. No.: WO00/08626

PCT Pub. Date: Feb. 17, 2000

(30) Foreign Application Priority Data

Nov. 16, 1998 (JP) .......................................... 10/324298
Aug. 3, 1998 (JP) .......................................... 10/218990

(51) Int. Cl.$^7$ .................................................. G09G 3/36
(52) U.S. Cl. ............................. 345/98; 345/76; 345/80; 345/87; 345/100; 345/204; 345/205; 345/206; 315/169.3
(58) Field of Search ........................... 345/76, 80, 87, 345/98, 100, 204, 205, 206; 315/169.3

(56) References Cited

U.S. PATENT DOCUMENTS

| | | | | |
|---|---|---|---|---|
| 5,648,794 A | * | 7/1997 | Jelsma et al. ................... | 345/90 |
| 5,670,977 A | | 9/1997 | Chiu et al. | |
| 5,835,075 A | * | 11/1998 | Nomura et al. ................ | 345/94 |
| 5,903,250 A | * | 5/1999 | Lee et al. ...................... | 345/100 |
| 6,025,835 A | * | 2/2000 | Aoki et al. .................... | 345/100 |
| 6,043,812 A | * | 3/2000 | Utsunomiya et al. ......... | 345/100 |
| 6,215,462 B1 | * | 4/2001 | Yamada et al. ............... | 345/76 |
| 6,229,512 B1 | * | 5/2001 | Shigehiro ...................... | 345/96 |
| 6,400,427 B1 | * | 6/2002 | Hanazawa et al. ............ | 349/44 |

FOREIGN PATENT DOCUMENTS

| | | |
|---|---|---|
| JP | A-59-139078 | 8/1984 |
| JP | A-63-71889 | 4/1988 |
| JP | A-2-90194 | 3/1990 |
| JP | A-3-112693 | 1/1991 |
| JP | A-3-64791 | 3/1991 |
| JP | A-4-181599 | 6/1992 |
| JP | A-8-166775 | 6/1996 |
| JP | A-8-179281 | 7/1996 |
| JP | A-8-179727 | 7/1996 |
| JP | A-8-211846 | 8/1996 |
| JP | A-8-314409 | 11/1996 |

* cited by examiner

Primary Examiner—Bipin Shalwala
Assistant Examiner—Vincent E. Kovalick
(74) Attorney, Agent, or Firm—Oliff & Berridge, PLC

(57) ABSTRACT

A substrate for an electrooptical device includes a signal electrode, a first sample-and-hold circuit electrically coupled to the signal electrode, a second sample-and-hold circuit electrically coupled to the signal electrode, a pixel drive circuit, and a pixel electrode electrically coupled to the pixel drive circuit. When a signal of an (N+1)-th image is applied to the signal electrode, the pixel drive circuit applies a voltage to the pixel electrode during a first duration of time in response to a signal of an N-th image stored in the first sample-and-hold circuit, and the second sample-and-hold circuit stores the signal of the (N+1)-th image within the first duration of time. When a signal of an (N+2)-th image is applied to the signal electrode, the pixel drive circuit applies a voltage to the pixel electrode during a second duration of time in response to the signal of the (N+1)-th image stored in the second sample-and-hold circuit and the first sample-and-hold circuit stores the signal of the (N+2)-th image within the second duration of time, and N is a natural number.

37 Claims, 24 Drawing Sheets

ELECTROOPTIC DEVICE, SUBSTRATE THEREFOR, ELECTRONIC DEVICE, AND PROJECTION DISPLAY

TECHNICAL FIELD

The present invention relates to a substrate for an electrooptical device, and, more particularly, to a substrate for an electrooptical device appropriate for use in a reflective electrooptical device.

BACKGROUND ART

A "light valve" in this description represents a transmissive light modulator element or a light-reflective light modulator element The applicant of this application has disclosed a substrate for a liquid-crystal display panel, the liquid-crystal display panel, and a projection display apparatus, to be discussed below, in Japanese Patent Application 8-279388 filed Oct. 22, 1996.

Referring to FIG. 18, a projection display apparatus (a liquid-crystal display projector) using a reflective liquid-crystal display panel as a light valve includes, in a system optical axis $L_0$, a polarizing illumination device 1100 mainly composed of a light source unit 1110, an integrator lens 1120, and a polarizer element 1130, a polarizing beam splitter 1200 which reflects an S-polarized light exiting from the polarizing illumination device 1100 from an S-polarized light reflecting surface 1201, a dichroic mirror 1412 which separates a blue light (B) component from the light beam reflected from the S-polarized light reflecting surface 1201 of the polarized light beam splitter 1200, a reflective liquid-crystal display light valve 1300B for modulating the separated blue light (B), a dichroic mirror 1413 for reflecting a red light (R) component of the light from which the blue light has been separated through the dichroic mirror 1412, a reflective liquid-crystal display light valve 1300R for modulating the separated red light (R), a reflective liquid-crystal display light valve 1300G for modulating the remaining green light (G) transmitted through the dichroic mirror 1413, and a projection optical system 1500 including a projection lens. Light beams modulated through the three reflective liquid-crystal display light valves 1300R, 1300G, and 1300B are directed in the opposite directions along the respective optical paths thereof, and are synthesized through the dichroic mirrors 1413 and 1412 and the polarizing beam splitter 1200. The synthesized light beam is then projected to a screen 1600 through the projection optical system 1500. A liquid-crystal display panel 530 shown in a cross-sectional view in FIG. 19 is used for each of the reflective liquid-crystal display light valves 1300R, 1300G, and 1300B.

The liquid-crystal display panel 530 includes a reflective liquid-crystal display panel substrate 531 which is affixed using an adhesive agent to a support substrate 532 made of glass or ceramic, a glass substrate (opposing substrate) 535 on a light incident side of the panel 530 having thereon an opposing electrode (common electrode) 533 made of a transparent electrically conductive film (ITO), separated from the reflective liquid-crystal display panel substrate 531 by a sealing material 536 that extends on and along the outline of the reflective liquid-crystal display panel substrate 531, and a known TN (Twisted Nematic) type liquid crystal 537 or an SH (Super Homeotropic) type liquid crystal 537 containing liquid-crystal molecules in a homeotropic alignment with no voltage applied, encapsulated in the space enclosed by the reflective liquid-crystal display panel substrate 531, the glass substrate 535, and the sealing material 536.

FIG. 20 shows a major circuit arrangement of the reflective liquid-crystal display panel substrate 531 used in the liquid-crystal display panel 530, and FIG. 21 is an enlarged plan view showing the layout of the reflective liquid-crystal display panel substrate 531. The reflective liquid-crystal display panel substrate 531 includes a rectangular pixel area (a display area) 520 in which a matrix of many pixel electrodes 514 shown in FIG. 19 is arranged, scanning line drive circuits (Y drivers) 522 (522R and 522L), arranged on the left- and right-hand sides of the pixel area 520 and composed of a shift register and a buffer circuit for scanning gate lines (scanning electrodes or row electrodes) $Y_0$–$Y_n$, a precharge and test circuit 523 arranged on and outside the top side of the pixel area 520 working for data lines (source lines, signal electrodes, or column electrodes) $X_0$–$X_m$ an image signal sampling circuit 524, arranged below the pixel area 520, for sampling an image signal in accordance with image data to feed the image signal to the data line $X_0$–$X_m$, an outline seal area 527 where the above-referenced sealing material 537 is positioned outside the scanning line drive circuit 522, the precharge and test circuit 523, and the image signal sampling circuit 524, a plurality of terminal pads 526 which are rigidly attached to a flexible tape wiring 539 through an anisotropic electrically conductive film (ACF) 538, a shift register 521 arranged between a row of the terminal pads 526 and the seal area 527 for generating a selection pulse for the image signal sampling circuit 524, and relay terminal pads (so-called silver-point pads) 529R and 529L arranged on both sides of the shift register 521 for feeding power to the opposing electrode 533 on the glass substrate 535.

The shift register 521 and the image signal sampling circuit 524 form a signal line drive circuit (X driver) 540 for driving the data lines $X_0$–$X_m$. The signal line drive circuit 540 employs a point-at-a-time scanning method in which the signal line drive circuit 540 successively feeds a data signal to the data lines $X_0$–$X_m$ one by one. The signal line drive circuit 540 may employ a line-at-a-time scanning method in which a data signal is concurrently fed to all data lines $X_0$–$X_m$. The pixel area 520, in which a matrix of pixels (pixel electrodes 514) is arranged, has the data lines $X_0$–$X_m$. and the gate lines $Y_0$–$Y_n$, arranged in a grid, and pixel selecting MOSFETs (insulated-gate field-effect transistors) T ($T_{00}$–$T_{nm}$) respectively arranged in intersections of the data lines and the gate lines. The source S of the transistor T of each pixel is connected to the data line X, and the gate G thereof is connected to the gate line, and the drain D thereof is connected to the pixel electrode 514 and storage capacitor C, as will be discussed later. The pixel electrode 514 of the reflective liquid-crystal display panel substrate 531 is connected to a liquid-crystal cell LC of the liquid crystal 537 encapsulated between the reflective liquid-crystal display panel substrate 531 and the glass substrate 535 as the opposing substrate.

A light shielding film 525 (see FIG. 19) is arranged at the same level as the pixel electrode 514, as a top layer, to prevent light from entering peripheral circuits (the scanning line drive circuits 522R and 522L, the precharge and test circuit 523, and the image signal sampling circuit 524) arranged inside the seal area 527.

FIG. 22 is an enlarged plan view partly showing the pixel area 520 of the reflective liquid-crystal display panel substrate 531, and FIG. 23 is a cross-sectional view of the pixel area 520 taken along line A—A' in FIG. 22. Referring to FIG. 23, designated 501 is a monocrystal P semiconductor substrate (an N semiconductor substrate is optional), and having a size as large as 20 mm by 20 mm, for instance. A P-type well region 502 is formed on the surface (major surface) of an element forming region (for a MOSFET, for instance) of the semiconductor substrate 501, and a field oxidation film (so-called LOCOS) 503 is formed to isolate elements in a non-element forming region of the semiconductor substrate 501. Referring to FIG. 23, the P-type well region 502 is formed as a common well region for the pixel area 520 where a matrix of a number of pixels, for instance, as many as 768×1024, is arranged in a matrix configuration and is separated from the P-type well region into which the elements for the peripheral circuits, outside the pixel area 520, (including the scanning line drive circuits 522R and 522L, the precharge and test circuit 523, the image signal sampling circuit 524, and the signal line drive circuit 521) are embedded.

Two openings are formed in the field oxidation film 503 in the segment region of each pixel. Formed in one opening is a pixel selecting N channel MOSFET (a gate-insulated field-effect transistor) T which is composed of a gate electrode 504a of polysilicon or metal silicide, formed on a gate insulating layer 504b in the center thereof, and an N$^+$source region 505a and an N$^+$drain region 505b, arranged on both sides of the gate electrode 504a on the surface of the P-type well region 502. The gate electrodes 504a of a plurality of pixels arranged in a row extend in the direction of rows of the pixels to form the gate line 504 (Y in FIG. 20).

A P capacitor electrode region 508, common to the direction of rows, is formed in the other opening on the P-type well region 502, and a capacitor electrode 509a of polysilicon or metal silicide is formed on the P capacitor electrode region 508 with an insulator film (a dielectric film) 509b interposed therebetween. The P capacitor electrode region 508 and the capacitor electrode 509a form a storage capacitor C that holds a signal selected by the pixel selecting transistor T.

A first interlayer insulator film 506 is deposited on the gate electrode 504a and the capacitor electrode 509a, and a first aluminum-based metal layer is deposited on the interlayer insulator film 506.

Included in the first metal layer are the data line 520 (X shown in FIG. 20) extending in the direction of columns, a source electrode wiring 506a electrically connected to the source region 504b through a contact hole 506a which is projected from the data line 507 in a comblike fashion, and a relay wiring 510 electrically connected to the drain region 505b via a contact hole 506b and electrically connected to the capacitor electrode 59a via a contact hole 506c.

A second interlayer insulator film 511 is formed on the first metal layer formed of the data line 507, the source electrode wiring 506a, and the relay wiring 510, and a second aluminum-based metal layer is deposited on the second interlayer insulator film 511. Included in the second metal layer is a light shielding film 512 for partly covering the pixel area 520. The second metal layer forming the light shielding film 512 serves as an interconnect wiring between elements in the peripheral circuits surrounding the pixel area 520 (including the scanning line drive circuits 522R and 522L, the precharge and test circuit 523, the image signal sampling circuit 524, and the signal line drive circuit 521).

A plug accommodating opening 512a is arranged in the light shielding film 512 in the position correspondingly above the relay wiring 510. A third interlayer insulator film 513 is formed on the light shielding film 512, and a rectangular pixel electrode 514 as a reflective electrode, generally corresponding to a single pixel is formed on the third insulator film 513. A contact hole 516 is arranged to pierce the third interlayer insulator film 513 and the second interlayer insulator film 511 correspondingly in the opening 512a of the light shielding film 512. After a refractory metal such as tungsten is embedded in the contact hole 516 using a CVD technique, the refractory metal deposited on the third insulator film 513 and the surface of the third insulator film 513 are polished using a CMP (chemical-mechanical polishing) to a mirror-grade flatness. In succession, an aluminum layer is deposited using a low-temperature sputtering technique, and is patterned to form a rectangular pixel electrode (reflective electrode) 514 having one side as long as 15 to 20 mm. The relay wiring 510 and the pixel electrode 514 thereabove are electrically connected through a column-like interconnect plug (interlayer conductor) 515. A passivation layer 517 is generally deposited over the pixel electrodes 514.

In a method available for producing the interconnect plug 515, after flattening the third insulator film 513 using the CMP technique, a contact hole is drilled, and a refractory metal, such as tungsten, is embedded thereinto.

In a method of driving the reflective liquid-crystal display panel substrate 531 thus constructed, the scanning line drive circuit 522 selects the gate line $Y_0$, and during a pixel selective period (a horizontal period), the signal line drive circuit 540 successively applies the data signal to the data lines $X_0$–$X_m$ one by one for each pixel selective period (column selective period), and the data signal is written onto the liquid-crystal cell LC connected to the storage capacitor C and the pixel electrode 514 in each pixel in a first column in a point-at-a-time scanning method.

For a selective period during which the scanning line drive circuit 522 selects the gate line $Y_1$, the data signal is written to the liquid-crystal cell LC connected to the storage capacitor C and the pixel electrode 514 in each of the pixels in a second row in a point-at-a-time scanning method. When the writing of the data signal is performed on the pixels on an (n+1)-th row in this way, the write period for all pixels (the transfer of one frame of the image signal in the signal line drive circuit 540) ends, and after all pixel display period, the transfer of the next frame starts over.

When the transfer of the next frame starts over, the data signal in the first row and the first column is refreshed (rewritten) during the selective period of the gate line $Y_0$, but the remaining pixels on the first row and the pixels on the second and subsequent rows maintain the signal of the prior frame. The switching between the image of the prior frame and the image of the subsequent frame successively takes place at the pixels in a point-at-a-time scanning method with both images concurrently presented on screen, thereby causing non-uniformity in the display screen.

When the number of pixels is relatively small, the write period is reduced, and the non-uniformity in the display screen is not so serious. As the number of pixels increases, the write time for all pixels becomes long, and the display time for all pixels becomes relatively short, and the non-uniformity of the display screen is pronounced, thereby degrading the image quality. The signal line drive circuit 540 may employ the line-at-a-time scanning method rather than the point-at-a-time scanning method. In such a case, however, during the write time for all pixels, the switching between the image of the prior frame and the image of the subsequent frame proceeds in a line-at-a-time scanning method, and is presented on the display screen. Non-uniformity in the display screen also results. When the number of pixels increases, the non-uniformity in the display screen leads to a degradation in the image quality. For this reason, the attempt to increase the size and definition of the display screen with a high number of pixels has been subject to a limitation.

In view of the above problem, a first object of the present invention is to provide a substrate for an electrooptical device which presents a high-quality image free from an image non-uniformity on the display screen with the sequence of writing not pronounced on the display screen regardless of whether a point-at-a-time writing method or a line-at-a-time writing method is in use.

It is a second object of the present to provide a substrate for an electrooptical device which is appropriate for use in a digitally driven display device such as a liquid crystal (LC), DMD, FED, PDP, EL, or LED.

DISCLOSURE OF THE INVENTION

A substrate for an electrooptical device of the present invention includes a signal electrode, a first sample-and-hold circuit electrically coupled to the signal electrode, a second sample-and-hold circuit electrically coupled to the signal electrode, a pixel drive circuit, and a pixel electrode electrically coupled to the pixel drive circuit, wherein, when a signal of an (N+1)-th image is applied to the signal electrode, the pixel drive circuit applies a voltage to the pixel electrode during a first duration of time in response to a signal of an N-th image stored in the first sample-and-hold circuit, and the second sample-and-hold circuit stores a signal of the (N+1)-th image within the first duration of time, and when a signal of an (N+2)-th image is applied to the signal electrode, the pixel drive circuit applies a voltage to the pixel electrode during a second duration of time in response to the signal of the (N+1)-th image stored in the second sample-and-hold circuit, and the first sample-and-hold circuit stores the signal of the (N+2)-th image within the second duration of time, and wherein N is a natural number. The present invention thus achieves the above objects.

Preferably, the substrate for an electrooptical device further includes a first scanning electrode to which a first write timing signal is applied, and a second scanning electrode to which a second write timing signal is applied, wherein the first sample-and-hold circuit includes a first signal hold circuit, and a first signal writing circuit electrically coupled to the first scanning electrode, the second sample-and-hold circuit includes a second signal hold circuit, and a second signal writing circuit electrically coupled to the second scanning electrode. The first signal writing circuit electrically connects the signal electrode to the first signal hold circuit in response to the first write timing signal, and the second signal writing circuit electrically connects the signal electrode to the second signal hold circuit in response to the second write timing signal.

In one embodiment, the first signal writing circuit is a first transistor, and the second signal writing circuit is a second transistor having the same semiconductor type as that of the first transistor.

In one embodiment, the first signal writing circuit is a first transistor, and the second signal writing circuit is a second transistor having a semiconductor type complementary to that of the first transistor.

Preferably, the substrate for an electrooptical device further includes a scanning electrode drive circuit for outputting a scanning electrode drive wave, and a write timing circuit for receiving a scanning electrode drive wave and a timing signal that alternates in level every frame period, wherein, in response to the scanning electrode drive wave and the timing signal, the write timing circuit applies the first write timing signal to the first scanning electrode during an odd frame period and applies the second write timing signal to the second scanning electrode during an even frame period.

In one embodiment, the substrate for an electrooptical device further includes an odd-frame scanning electrode drive circuit for applying the first write timing signal to the first scanning electrode during an odd frame period, and an even-frame scanning electrode drive circuit for applying the second write timing signal to the second scanning electrode during an even frame period.

Preferably, the pixel drive circuit includes a first signal reading circuit, a second signal reading circuit, and a common pixel drive circuit, wherein the first signal reading circuit electrically connects the first sample-and-hold circuit to the common pixel drive circuit in response to a first read timing signal, the second signal reading circuit electrically connects the second signal hold circuit to the common pixel drive circuit in response to a second read timing signal, and the common pixel drive circuit drives a pixel in response to the signal from one of the first reading circuit and the second reading circuit.

In one embodiment, the first reading circuit is a third transistor, and the first reading circuit is a fourth transistor having the same semiconductor type as that of the third transistor.

Preferably, the first reading circuit is a third transistor, the first reading circuit is a fourth transistor having a semiconductor type complementary to that of the third transistor, and the first read timing signal and the second read timing signal are the same signal.

In one embodiment, the common electrode drive circuit is a fifth transistor, one terminal of the fifth transistor is electrically connected to a pixel drive power source, and the other terminal of the fifth transistor is electrically connected to the pixel electrode.

In another embodiment, the common electrode drive circuit is a fifth transistor, one terminal of the fifth transistor is electrically connected to a pixel drive power source, and the other terminal of the fifth transistor is electrically connected to the pixel electrode.

In yet another embodiment, the pixel drive circuit includes a first pixel drive circuit, and a second pixel drive circuit, wherein the first pixel drive circuit electrically connects the first sample-and-hold circuit to the pixel electrode in response to the first read timing signal, and the second pixel drive circuit electrically connects the second sample-and-hold circuit to the pixel electrode in response to the second read timing signal.

In yet another embodiment, the first pixel drive circuit is a third transistor, and the second pixel drive circuit is a fourth transistor having the same semiconductor type as that of the third transistor.

Preferably, the substrate for an electrooptical device further includes a read timing circuit, wherein the read timing circuit outputs the first read timing signal during an odd frame period and outputs the second read timing signal during an even frame period, in response to a timing signal, the level of which alternates every frame period.

In one embodiment, the read timing circuit interposes a blanking period between the first read timing signal and the second read timing signal.

In yet another embodiment, the first pixel drive circuit is a third transistor, and the second pixel, drive circuit is a fourth transistor having a semiconductor type complementary to that of the third transistor.

Preferably, the timing signal, which alternates in level every frame period, is used as the first read timing signal during the odd frame and is used as the second read timing signal during the even frame.

In one embodiment, a signal applied to the signal electrode is an analog signal.

In yet another embodiment, a signal applied to the signal electrode is a pulse-width modulated signal.

In yet another embodiment, the electrooptical device of the present invention includes the substrate for the electrooptical device, a light-transmissive substrate opposing the substrate for the electrooptical device, and an electrooptical material interposed between the substrate for the electrooptical device and the light-transmissive substrate.

In yet another embodiment, an opposing electrode is mounted on the light-transmissive substrate, and a common voltage, which alternates every frame period, is applied to the opposing electrode.

In yet another embodiment, electronic equipment of the present invention includes the electrooptical device, as a display unit.

In yet another embodiment, a projection display apparatus of the present invention includes the electrooptical device as a light modulator unit.

A substrate for an electrooptical device of the present invention includes a plurality of pixel electrodes arranged in a matrix configuration and a plurality of storage circuits respectively electrically coupled to the plurality of the pixel electrodes, wherein each of the plurality of the storage circuits includes a first latch circuit, and a second latch circuit, wherein the first latch circuit is electrically coupled to at least one first scanning line and a signal electrode, and he second latch circuit is electrically coupled to at least one second scanning line, the first latch circuit, and the pixel electrode. When the first latch circuit is supplied with a first timing signal through at least one first scanning line, the first latch circuit stores a data signal applied to the signal electrode until a next first timing signal is applied. When the second latch circuit is supplied with a second timing signal through at least one second scanning line, the second latch circuit receives the data signal stored in the first latch circuit, and feeds the data signal to the pixel electrode until a next second timing signal is applied. The first timing signal is successively applied to all first latch circuits in a row in the matrix configuration, and the second timing signal is concurrently applied to all second latch circuits each time the first timing signal is applied to all first latch circuits in the row. The present invention thus achieves the above objects.

A substrate for an electrooptical device of the present invention having a pixel electrode for a pixel at each of intersections of scanning electrodes and signal electrodes arranged in a matrix configuration, includes digital storage means, which includes a plurality of cascaded storage cells, and is arranged for each pixel to drive the pixel in accordance with the storage output from the last stage of the storage cells, wherein the digital storage means temporarily stores digital data coming in to the signal electrode in the plurality of the cascaded storage cells while shifting the stored data along the cascaded storage cells thereof. The present invention thus achieves the above objects.

Preferably, the first latch circuit includes a first data selecting element for capturing the data signal, and a first flipflop for storing the data signal captured through the first data selecting element, and the second latch circuit includes a second data selecting element for capturing the data signal stored in the first flipflop, and a second flipflop for storing the data signal captured through the second data selecting element, wherein an output terminal of the second flipflop is electrically connected to the pixel electrode.

Preferably, the first data selecting element is a first transistor for electrically connecting the data signal line to the first flipflop in synchronization with the first timing signal, the first flipflop is a first synchronization flipflop which performs a storage operation in synchronization with the first timing signal, the second data selecting element is a second transistor for electrically connecting the first flipflop to the second flipflop in synchronization with the second timing signal, and the second flipflop is a second synchronization flipflop which performs a storage operation in synchronization with the second timing signal.

In one embodiment, the first data selecting element is a first one-input gating element which performs a logic operation in synchronization with the first timing signal, the first flipflop is a first synchronization flipflop which performs a storage operation in synchronization with the first timing signal, the second data selecting element is a second one-input gating element which performs a logic operation in synchronization with the second timing signal, and the second flipflop is a second synchronization flipflop which performs a storage operation in synchronization with the second timing signal.

In yet another embodiment, at least one of the first one-input gating element and the second one-input gating element is a clocked inverter.

In yet another embodiment, at least one of the first one-input gating element and the second one-input gating element is a three-state buffer.

Preferably, the first synchronization flipflop includes a first even-numbered inverter circuit including an even number of inverters connected in a cascade configuration, and a first storage control transistor for disconnecting an electrical connection between the input of an initial-stage inverter and the output of a feedback inverter in the first even-numbered inverter circuit in synchronization with the first timing signal, the second synchronization flipflop includes a second even-numbered inverter circuit including an even number of inverters connected in a cascade configuration, and a second storage control transistor for disconnecting an electrical connection between the input of an initial-stage inverter and the output of a feedback inverter in the second even-numbered inverter circuit in synchronization with the second timing signal.

In one embodiment, the first synchronization flipflop includes a first even-numbered inverter circuit including an even number of inverters connected in a cascade configuration, a feedback stage inverter in the first even-numbered inverter circuit is a first clocked inverter which suspends a logic operation in synchronization with the first timing signal, the second synchronization flipflop includes a second even-numbered inverter circuit including an even number of inverters connected in a cascade configuration, and a feedback-stage inverter in the second even-numbered inverter circuit is a first clocked inverter which suspends a logic operation in synchronization with the first timing signal.

Preferably, at least one of the first even-numbered inverter circuit and the second even-numbered inverter circuit is a double inverter circuit having two inverters.

Preferably, the substrate for an electrooptical device further includes a serial-to-parallel converting shift register for applying the digital data to the signal electrode, a scanning electrode selecting shift register for successively selecting the scanning electrodes, a latch timing circuit for generating the first timing signal in accordance with a scanning electrode drive wave from the scanning electrode selecting shift register.

In one embodiment, an electrooptical device of the present invention includes the substrate for the electrooptical device, a light-transmissive substrate opposing the substrate for the electrooptical device, and an electrooptical material interposed between the substrate for the electrooptical device and the light-transmissive substrate.

In yet another embodiment, an opposing electrode is mounted on the light-transmissive substrate, and a common voltage, which alternates every frame period, is applied to the opposing electrode.

In yet another embodiment, electronic equipment includes the electrooptical device, as a display unit.

In still yet another embodiment, a projection display apparatus of the present invention includes the electrooptical device, as a light modulator unit.

A substrate for an electrooptical device of the present invention includes a plurality of pixel electrodes arranged in a matrix configuration, and a plurality of active element circuits respectively electrically coupled to the plurality of the pixel electrodes, wherein each of the plurality of active element circuits performs concurrently in parallel both a pixel drive operation for reading a temporarily stored prior signal to drive a pixel, and a temporary storage operation for storing a subsequent signal for the same pixel which occurs in the signal electrode after a predetermined duration of time from the prior signal. The present invention thus achieves the above object.

To resolve the above problem, the present invention provides means in an electrooptical device having a pixel electrode of a pixel at each of intersections of the scanning electrodes and the signal electrodes arranged in a matrix configuration, wherein each pixel includes an embedded active element circuit which performs concurrently in parallel both a pixel drive operation for reading a temporarily stored prior signal (a signal of a prior frame, for instance) to drive a pixel, and a temporary storage operation for storing a subsequent signal (a signal of a subsequent frame, for example) for the same pixel which occurs in the signal electrode after a predetermined duration from the prior signal.

In conventional active element circuits, the timing of temporarily storing a signal in a storage capacitor in the same pixel and the timing of pixel driving the electrooptical material coincide with each other. In accordance with the electrooptical device of the present invention, the timing of temporarily storing the signal from the signal electrode and the timing of reading the temporarily stored signal to drive the pixel are positively shifted within a constant duration (one frame period, for instance), all pixels are concurrently driven for a next period (for a concurrent still image presentation). The constant duration is not limited to a full frame period, and when one full frame successively includes R, G, and B subframes in a color-sequential display method (a field color successive presentation method), the subframe is also treated as a constant duration.

Regardless of the point-at-a-time scanning method and the line-at-a-time scanning method, the write sequence is merely a temporary storage sequence in the present invention. The write sequence is not pronounced as a pixel drive sequence, and frame switching is performed at a time on all pixels. For this reason, the non-uniformity on the display screen is eliminated, and a substrate for an electrooptical device having a high image quality is provided. A large-size display screen or high-definition display screen results regardless of the number of pixels. Concurrent driving of all pixels (concurrent still image presentation) is performed for a constant duration (one frame period, for instance). Since the display time and the write time are not exclusive to each other, the display time is allowed to be longer than that in the conventional art. A higher definition display is thus provided. The temporary storage operation for all pixels for the constant duration (one frame period, for instance) is achieved, permitting longer write time. With a slow signal transfer speed, the peripheral circuits are simplified in construction or modified to accommodate a higher number of pixels. A frame memory for display data attached external to the electrooptical device substrate is dispensed with.

The delayed pixel drive type active element circuit includes a plurality of sample-and-hold means that performs the temporary storage operation exclusively or successively in a time division manner to capture a signal from a signal electrode, and pixel drive means that performs the pixel drive operation exclusively or successively in a time division manner by reading the temporarily stored signal from the sample-and-hold means. It is generally sufficient if the sample-and-hold means is constructed of first and second sample-and-hold means. In such a case, the write duration of the subsequent signal and the pixel drive duration for the prior signal coincide with each other. The use of third sample-and-hold means is optional. When N sample-and-hold means are used, the write duration of the subsequent signal is set to be (N−1) times the pixel drive duration for the prior signal. The effect of the simplification of the peripheral circuits and the use of a high number of pixels are substantial as a result of a slow signal transfer speed. When three sample-and-hold means are used in the color sequential display method, a B subframe signal may be written throughout the pixel drive period for an R subframe and the pixel drive period for a G subframe.

Focusing on the signal of the sample-and-hold means, a serial signal on a signal electrode line is serial-to-parallel converted into a prior signal and a subsequent signal through the sample-and-hold means when a single line of signal electrodes is assigned to pixels, and the prior signal and the subsequent signal are then temporarily stored therein. In such a case, the required number of scanning electrodes for controlling the selection timing of a plurality of sample-and-hold means becomes equal to the number of the sample-and-hold means. For instance, when there are first and second sample-and-hold means, a single line of signal electrode and two lines of scanning electrodes are needed. Conversely, when there are a signal line dedicated to an odd frame and a signal line dedicated to an even frame, a single scanning line is shared, and the first and second sample-and-hold means perform a temporary storage function rather than functioning as a serial-to-parallel converter means.

The first sample-and-hold means includes first signal hold means and first signal writing means for sampling a signal on the signal electrode into the first signal hold means by on and off operations in response to a first selection timing signal. The second sample-and-hold means includes second signal hold means and second signal writing means for sampling a signal on the signal electrode into the second signal hold means by on and off operations in response to a second selection timing signal. The prior signal (a signal of a prior (odd) frame, for instance) is temporarily held in the first signal hold means by the first signal writing means, while the subsequent signal (a signal of a subsequent (even) frame, for instance) is temporarily held in the second signal hold means by the second signal writing means.

Specifically, the first signal writing means is a first transistor with one terminal thereof electrically connected to the signal electrode and with the other terminal thereof electrically connected to the first signal hold means. The second signal writing means is a second transistor having the same semiconductor type as that of the first transistor, with one terminal electrically connected to the signal electrode and with the other terminal electrically connected to the second signal writing means. The transistors are not limited to unipolar transistors. Bipolar transistors may also be used. The use of the first and second transistors of the same semiconductor type controls differences in element characteristics, thereby providing advantages in analog driving.

In contrast, the first signal writing means may be a first transistor with one terminal thereof electrically connected to the signal electrode and with the other terminal thereof electrically connected to the first signal hold means. The second signal writing means may be a second transistor having a semiconductor type complementary to that of the first transistor, with one terminal electrically connected to the signal electrode and with the other terminal electrically connected to the second signal writing means. The two transistors are thus complementary to each other in polarity.

With these first and second sampling means incorporated in the active element circuit, write timing means is required in the peripheral circuits to feed the first write timing signal and the second write timing signal to the active element circuit. As the write timing means, a timing signal such as an AC signal alternating at every frame period may be used. Specifically, in response to the timing signal of the scanning electrode drive wave from the scanning electrode drive means, the write timing means generates the first write timing signal during-the odd frame period and the second write timing signal during the even frame period. The write timing means may be constructed of a simple logic circuit, for instance.

A modified conventional scanning electrode means (a Y shift register) may be used as the write timing means of the present invention. Specifically, employed as the write timing means are odd-frame scanning electrode drive means for successively generating the first write timing signal for rows of pixels during the odd frame period through the first scanning electrodes, and even-frame scanning electrode drive means for successively generating the second write timing signal for rows of pixels during the even frame period through the second scanning electrodes.

The above-referenced pixel drive means includes first signal reading means for reading a first temporary storage signal by on and off operations in response to a first read timing signal, second signal reading means for reading a second temporary storage signal by on and off operations in response to a second read timing signal, and common pixel drive means for performing pixel driving on the pixel electrodes in response to the signal that is successively read from the first signal reading means and the second signal reading means. The pixel drive means separately performs the read-only function and the pixel drive-only function. The pixel drive means may be used for digital driving and analog driving.

When the prior signal is read from the first signal hold means through the first signal reading means, the common pixel drive means drives the pixel electrodes for one frame period in response to the prior signal. When the subsequent signal is read from the second signal hold means through the second signal reading means in the next frame period, the common pixel drive means drives the pixel electrodes in response to the subsequent signal.

The first signal reading means is a third transistor with one terminal thereof electrically connected to the first sample-and-hold means and with the other terminal thereof electrically connected to a control input of the common pixel drive means. The second signal reading means is a fourth transistor which is of the same semiconductor type as that of the third transistor, with one terminal thereof electrically connected to the second sample-and-hold means and with the other terminal thereof electrically connected to the control input of the common pixel drive means. The use of the third and fourth transistors of the same semiconductor type controls differences in element characteristics, thereby providing advantages in analog driving. Since the two transistors perform on and off operations in accordance with on and off control signal of the same logic, the two transistors need their own dedicated scanning electrodes for exclusive on and off control.

In contrast, the first signal reading means may be a third transistor with one terminal thereof electrically connected to the first sample-and-hold means and with the other terminal thereof electrically connected to a control input of the common pixel drive means. The second signal reading means may be a fourth transistor which is of a semiconductor type complementary to that of the third transistor, with one terminal thereof electrically connected to the second sample-and-hold means and with the other terminal thereof electrically connected to the control input of the common pixel drive means. The two transistors are thus complementary to each other in polarity. In such a case, the third and fourth transistors respectively perform the on and off operations in accordance with mutually opposite logic on and off control signals, and a single common scanning electrode for the write timing signal works.

The common pixel drive means may be a fifth transistor with one terminal thereof electrically connected to a pixel drive power source and with the other terminal thereof electrically connected to the pixel electrode.

Another pixel drive means may include first pixel drive means for reading a first temporary storage signal by on and off operations in response to a first read timing signal and performing pixel driving on the pixel electrode in accordance with the read signal, and second pixel drive means for reading a second temporary storage signal by on and off operations in response to a second read timing signal and performing pixel driving on the pixel electrode in accordance with the read signal. The pixel drive means separately performs prior signal only reading and driving function and subsequent signal only reading and driving function. The pixel drive means is particularly suitable for use in analog driving.

When the prior signal is read from the first signal hold means through the first pixel drive means, the pixel electrodes are driven during one frame period in response to the prior signal. When the subsequent signal is read from the second signal hold means through the second pixel drive means during the next frame period, the pixel electrodes are driven during one frame in response to the subsequent signal. With no common pixel drive means incorporated, the active element count in the active element circuit and the lines for the pixel drive power source are accordingly reduced.

Like the above-referenced first pixel exciting means, in this pixel drive means, the first pixel drive means is a third transistor with one terminal thereof electrically connected to the first sample-and-hold means and with the other terminal thereof electrically connected to the signal electrode. The second pixel drive means is a fourth transistor which is of the same semiconductor type as that of the third transistor, with one terminal thereof electrically connected to the second sample-and-hold means and with the other terminal thereof electrically connected to the pixel electrode. The use of the third and fourth transistors of the same semiconductor type controls differences in element characteristics, thereby providing advantages in analog driving.

With these pixel drive means incorporated in the active element circuit, read timing means is required in the peripheral circuits to generate the first read timing signal and the second read timing signal. Taking advantage of a timing signal that alternates each frame period, the read timing means may generate the first read timing signal during the odd frame and the second read timing signal during the even frame.

When the first read timing signal and the second read timing signal are alternately generated every frame period in an exclusive manner, there is a possibility that one or both of the first signal reading means (the first pixel drive means) and the second signal reading means (the second pixel drive means) become conductive at the frame switching, making a hold signal irregular. The read timing means is preferably read idle timing means which interposes a blanking period between the first read timing signal and the second read timing signal. The read idle timing means may be constructed of a simple logic circuit that uses the AC driving signal and a blanking period setting clock. In the color sequential type display, in particular, an additive color process is prevented during the color light source switching, and a high color image quality results.

The first pixel drive means is a third transistor with one terminal thereof electrically connected to the first sample-and-hold means and with the other terminal thereof electrically connected to the signal electrode. The second pixel drive means is a fourth transistor which is of a semiconductor type complementary to that of the third transistor, with one terminal thereof electrically connected to the second sample-and-hold means and with the other terminal thereof electrically connected to the pixel electrode. In this arrangement, the first read timing signal and the second read timing signal are opposite to each other in logic. Even if the first read timing signal and the second read timing signal are alternately generated in an exclusive manner, the possibility of concurrent conduction of the transistors at the frame switching is low, compared to the same semiconductor type transistors. The timing signal that alternates every frame is used as the first read timing signal during the odd frame and is used as the second read timing signal during the even frame. This arrangement serves the purpose of simplification of the peripheral circuit. Even in this case, however, the setting of a blanking period prevents the additive color process during the color light source switching in the color sequential type display, and a high color image quality results.

The substrate for the electrooptical device of the present invention is not limited to the one in which the above-discussed active element circuit is embedded in a monocrystal semiconductor substrate. The substrate may be one in which a TFT is formed on an insulating transparent substrate, such as a glass substrate or a quartz substrate, using thin-film technique. Compared to the above-described active element circuit, such substrate finds many applications as a transparent electrooptical device substrate, although it has a slightly higher component count.

When the signal on the signal line is an analog signal, analog driving is performed on the pixels. When the signal on the signal line is pulse-width modulated, digital driving is performed on the pixels.

An electrooptical device is constructed by assembling the above-referenced electrooptical device substrate and an opposing transparent substrate, and by encapsulating an electrooptical material between the substrates. The electrooptical material is not limited to a liquid crystal. Alternatively, a new electrooptical material for a voltage-driven element, such as an EL (Electroluminescence) material or DMD (digital mirror device) material, may be employed.

When a common voltage that alternates every frame period is applied, directly or via the electrooptical device substrate, to the opposing electrode of the transparent substrate in the electrooptical device, the electrooptical material is AC driven even if the AC driving of the pixel electrode is difficult. For instance, when the electrooptical material is a liquid crystal, a degradation of the liquid crystal is avoided. Since the dynamic range of the signal applied to the pixel electrode is relatively reduced, active elements in the active element circuit are fabricated of low withstand-voltage ones. This permits fine structured elements to be implemented, leading to a reduced area size of the element. A high-definition display apparatus with an increased aperture ratio thus results.

When such an electrooptical device is incorporated in a diversity of electronic equipment as a display unit, a high image quality display is presented. The electrooptical device is appropriate for use as a light valve in a projection display apparatus, for instance.

To resolve the problems, the present invention provides first means in a substrate for an electrooptical device (digitally driven display device such as LC, DMD, FED, PDP, EL, or LED) including a pixel electrode for each of pixels arranged at intersections of scanning electrodes and signal electrodes in a matrix configuration,. wherein each pixel is associated with digital storage means which performs concurrently in parallel both a pixel driving operation in accordance with temporarily stored prior digital data (data of a prior frame, for instance) and a temporary storage operation for subsequent digital data (data of a subsequent frame, for instance) of the same pixel that comes in to the signal electrode after a constant duration from the prior digital data.

In conventional active element circuits, the timing of temporarily storing data in a storage capacitor and the timing of pixel driving the electrooptical material with the same data coincide with each other. In accordance with the electrooptical device substrate of the present invention, the timing of temporarily storing the data from the signal electrode and the timing of reading the temporarily stored signal to drive the pixel are positively phase-shifted until all pixel data are accumulated. Data is written on all pixels during the prior frame period, and all pixels are concurrently displayed (in a still image) during the next frame period. The constant duration is not limited to a full frame period, and when one full frame successively includes R, G, and B subframes in a color-sequential display method (a field color successive presentation method), the subframe is also treated as a constant duration.

Regardless of the point-at-a-time scanning method or the line-at-a-time scanning method, the write sequence is merely a temporary storage sequence in the present invention. The write sequence is not pronounced as a pixel drive sequence, and frame switching is performed at a time on all pixels. For this reason, the non-uniformity on the display screen is eliminated, and a substrate for an electrooptical device having a high image quality is provided. A large-size display screen or high-definition display screen results regardless of the number of pixels. Since the ratio of the display time and the write time within one frame period are not exclusive to each other, the display time for all pixels is allowed to be longer than that in the conventional art, and a higher definition display is thus provided. The write operation for all pixels throughout a predetermined period of time (one frame period, for instance) is performed, allowing the write time to be extended. With a slow signal transfer speed, the peripheral circuits are simplified in construction or modified to accommodate a higher number of pixels. A frame memory for display data attached external to the electrooptical device substrate is dispensed with.

When the signal on the signal electrode is pulse-width-modulated, the digital driving of the pixel is possible. In the present invention, however, the pixel driving method is a static driving based on temporarily stored data rather than a dynamic driving, and is thus free from the attenuation of a pixel drive signal. A perfect digital driving is thus possible.

When a plurality of storage cells are connected in parallel and operative with the signal electrode in an exclusive or alternate manner in the first means, the storage cells need to be switched at the switching of the frames. Driving the pixel electrodes constantly in a static driving manner using the same storage cells is difficult.

The present invention thus provides second means in an electrooptical device substrate including a pixel electrode for each of pixels arranged at intersections of scanning electrodes and signal electrodes in a matrix configuration, wherein each pixel is associated with digital storage means which successively shifts digital data coming to the signal electrode along a plurality of cascaded storage cells while temporarily storing the digital data and drives the pixels in accordance with an storage output of the last stage of the storage cells.

Since in such digital storage means, the last stage of the storage cells is the one responsible for static driving of the pixel electrode, perfect digital driving becomes possible. It is generally sufficient if two stages of storage cells are used. The use of three or more stages of storage cells is optional. When the storage cells are of two stages, the construction thereof becomes delay means with a phase shift quantity having a predetermined duration, and is identical to a shift register or an FIR filter having one or more taps.

When the two-stage storage cells are used, the digital storage means includes first latch means for capturing and temporarily storing digital data coming to the signal electrode, and second latch means for reading and temporarily storing prior digital data, which the first latch means stored a constant duration prior to the digital data, before the data capturing by the first latch means, and for driving the pixels in response to the storage output thereof. The digital storage means is characterized in that the second latch means performs static driving while the first latch means functions as data delay means.

The first latch means includes first data selecting means for capturing the digital data, and a first flipflop for temporarily storing the data captured by the first data selecting means. The second latch means includes second data selecting means for capturing the output data from the first flipflop, and a second flipflop for temporarily storing the data captured by the second data selecting means. The storage output of the second flipflop is electrically connected to the pixel electrode. The first flipflop functions as data delay means, while the second flipflop functions as static drive means for the pixel electrode.

The data selecting means may be arranged in a variety of configurations. For instance, the first data selecting means may be a first data-transfer transistor that becomes conductive in synchronization with a first timing pulse, the first flip flop may be a first synchronization flipflop that performs a storage operation in synchronization with the first timing pulse, the second data selecting means may be a second data-transfer MOSFET that conducts in synchronization with a second timing pulse that is generated prior to the second timing pulse, and the second flipflop may be a second synchronization flipflop that performs a storage operation in synchronization with the second timing pulse. The use of the data selecting means, fabricated of a single transistor, serves the purpose of component count reduction.

Alternatively, the first data selecting means may be a first one-input gating element that performs a logic operation in synchronization with the first timing pulse, the first flipflop may be a first synchronization flipflop that performs a storage operation in synchronization with the first timing pulse, the second data selecting means may be a second one-input type gating element that performs a logic operation in synchronization with the second timing pulse, and the second flipflop may be a second synchronization flipflop that performs a storage operation in synchronization with the second timing pulse. Although the one-input gating element requires two or more transistors, this arrangement is effective in the reduction of power consumption, wave shaping, and energy amplification, functions as writing and drive means, and helps assure that storage operation be reliably performed. The one-input type gating element may be a clocked inverter or a three-state buffer.

The flipflop may be arranged in a variety of configurations. For instance, the first synchronization flipflop includes a first even-number inverter circuit having an even number of inverters connected in a cascade configuration, and a first storage control transistor for temporarily disconnecting an electrical connection between the input of an initial-stage inverter and the output of a feedback-stage inverter in synchronization with the first timing pulse. The second synchronization flipflop includes a second even-number inverter circuit having an even number of inverters connected in a cascade configuration, and a second storage control transistor for temporarily disconnecting an electrical connection between the input of an initial-stage inverter and the output of a feedback-stage inverter in synchronization with the second timing pulse.

When a logic value, different from a logic value stored in the even-number inverter circuit, is set through the data selecting means with the output of a feedback-stage inverter connected to the input of the even-number inverter circuit, the set logic value and the storage logic value interfere with each other, causing an unstable state. During the setting of the even-number inverter circuit, the storage operation is temporarily suspended by the storage control transistor so that the setting of data from the data selecting means is prioritized. After the data setting, the storage control transistor is turned on, performing data storage.

The first synchronization flipflop is a first even-number inverter circuit having an even number of inverters connected in a cascade configuration, with a feedback stage inverter thereof being a clocked inverter which suspends a logic operation in synchronization with the first timing signal. The second synchronization flipflop is a second even-number inverter circuit having an even number of inverters connected in a cascade configuration, with a feedback stage inverter thereof being a first clocked inverter which suspends a logic operation in synchronization with the second timing signal. In this case again, the storage operation is suspended by the clocked inverter during the setting so that the setting of data from the data selecting means is prioritized.

Although the even-number inverter circuit having a large number of stages provides a stronger buffer effect, a double inverter circuit having two stages of inverters suffices. This arrangement reduces the component count.

The substrate of the electrooptical device of the present invention includes a peripheral drive circuit including a serial-to-parallel converting shift register for applying the digital data to the signal electrode, a scanning electrode selecting shift register for successively selecting the scanning electrodes, and latch timing means for generating the first timing signal in accordance with a scanning electrode drive wave from the scanning electrode selecting shift register. The implementation of a high degree of integration results in a cost reduction.

The substrate for the electrooptical device of the present invention is not limited to the one in which the above-discussed digital storage means is embedded in a monocrystal semiconductor substrate. The substrate may be one in which a TFT is formed on an insulating transparent substrate, such as a glass substrate or a quartz substrate, using thin-film technique. Although the substrate of the electrooptical device of the present invention has a slightly higher component count, compared to the above-described active element circuit, the aperture ratio thereof is not a problem in a projection display apparatus. The use of fine structure technique in the element areas allows the substrate of the present invention to find applications as a transmissive electrooptical device substrate.

An electrooptical device is constructed by assembling the above-referenced electrooptical device substrate and an opposing transparent substrate, and by encapsulating an electrooptical material between the substrates. The electrooptical material is not limited to a liquid crystal. Alternatively, a new electrooptical material for a voltage-driven element, such as an EL (Electroluminescence) material or DMD (digital mirror device) material, may be employed.

When a common voltage that alternates every frame period (a frame period, for instance) is applied, directly or via the electrooptical device substrate, to the opposing electrode of the transparent substrate in the electrooptical device, the electrooptical material is AC driven even if the AC driving of the pixel electrode is difficult. For instance, when the electrooptical material is a liquid crystal, a degradation of the liquid crystal is avoided. Since the logical amplitude of the signal applied to the pixel electrode is relatively reduced, active elements in the active element circuit can thus be fabricated of low withstand-voltage ones. This permits fine structured elements to be implemented, leading to a reduced area size of the element. A high-definition display apparatus with an increased aperture ratio thus results.

When such an electrooptical device is incorporated in a diversity of electronic equipment as a display unit, a high image quality display is presented. The electrooptical device is appropriate for use as a light valve in a projection display apparatus, for instance.

BEST MODE FOR CARRYING OUT THE INVENTION

Figure 1:
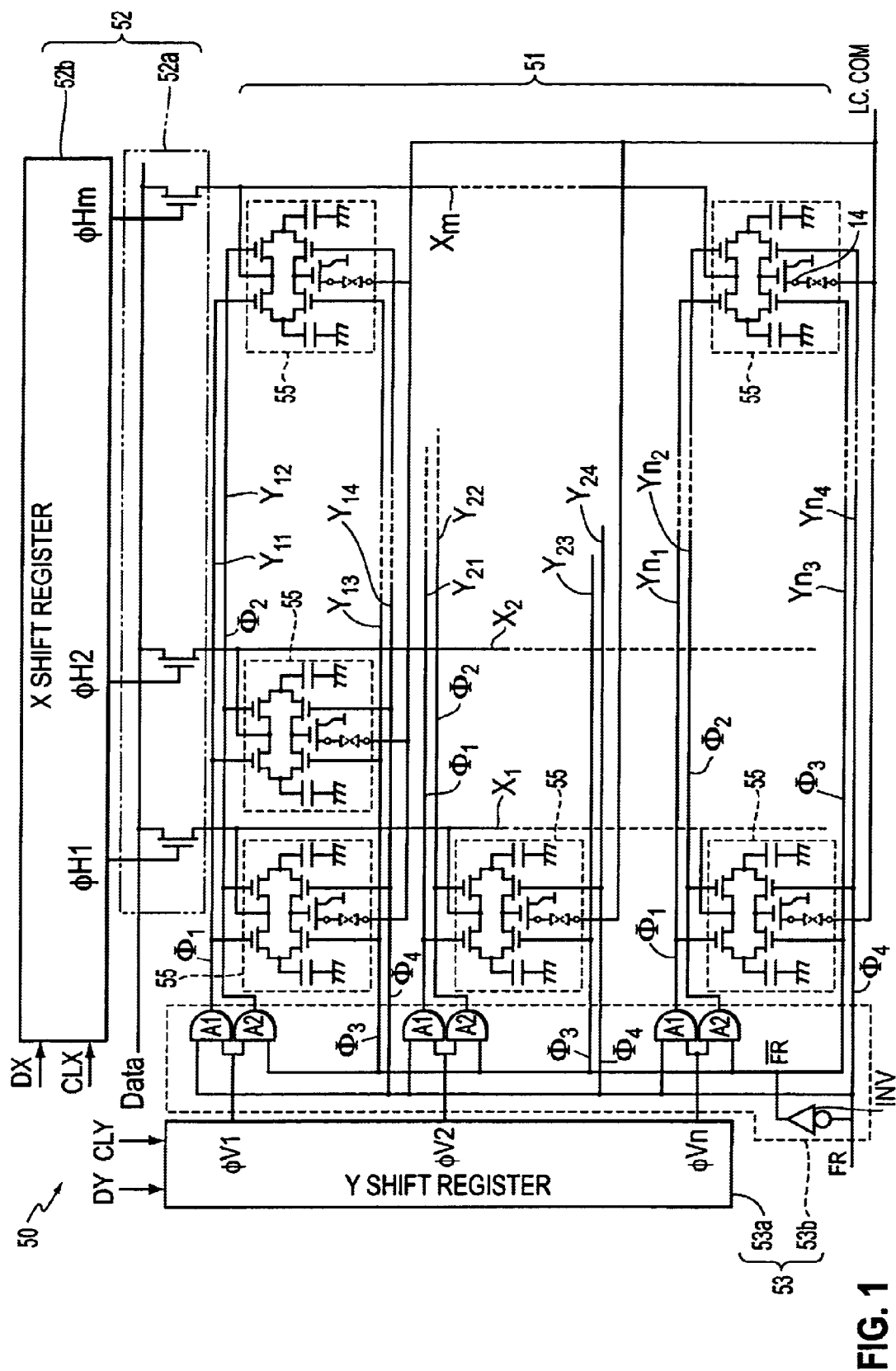
FIG. 1 is a circuit diagram showing an active-matrix liquid-crystal display element drive circuit embedded in a panel substrate as a reflective liquid-crystal display panel of a first embodiment of the present invention.

The present invention is discussed in more detail referring to the embodiments shown in the drawings.

In the following discussion, an odd frame signal V(O) refers to an image signal for an image corresponding to an odd frame. Similarly, an even frame signal V(E) refers to an image signal for an image corresponding to an even frame. Furthermore, the odd frame signal V(O) and the even frame signal V(E) respectively refer to "the signal of an N-th image" and "the signal of an (N+1)-th image". Here, N is a natural number.

The "N-th image" and "(N+1)-th image" represent not only the image of the odd frame and the image of the even frame, but also images of a plurality of subframes in one frame.

First Embodiment

Figure 2A:
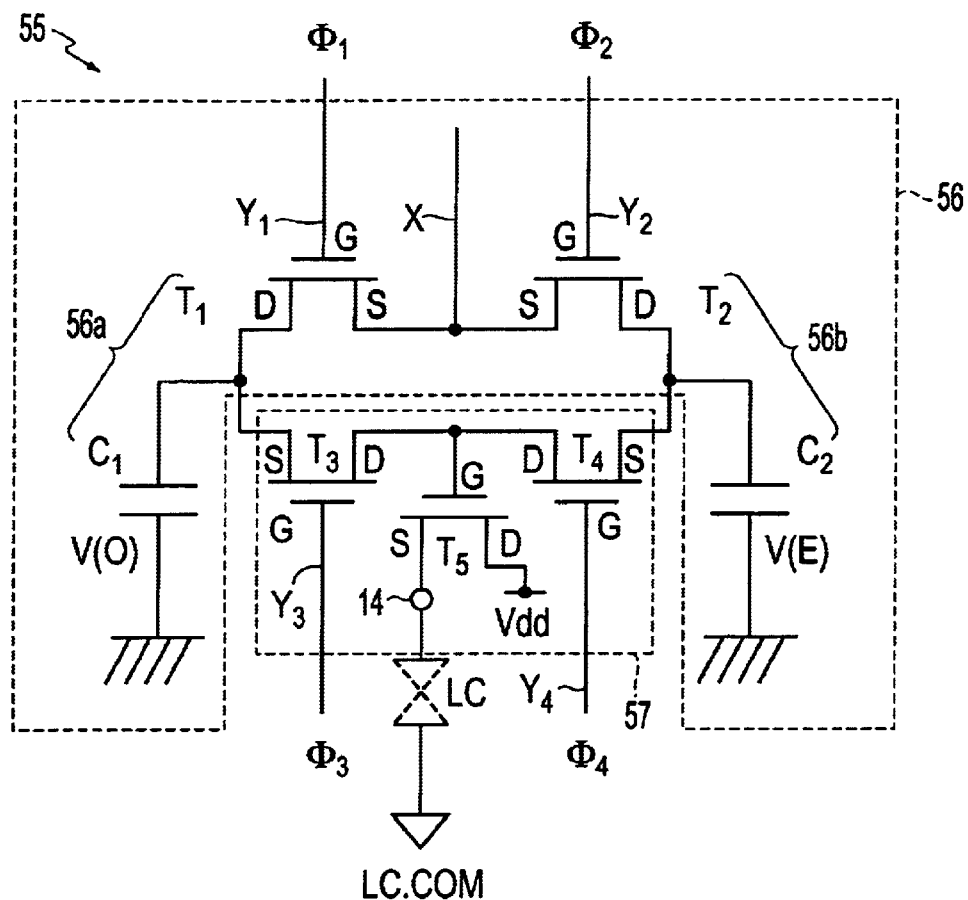
FIG. 2(A) is a circuit diagram showing an active element circuit in the first embodiment.
Figure 2B:
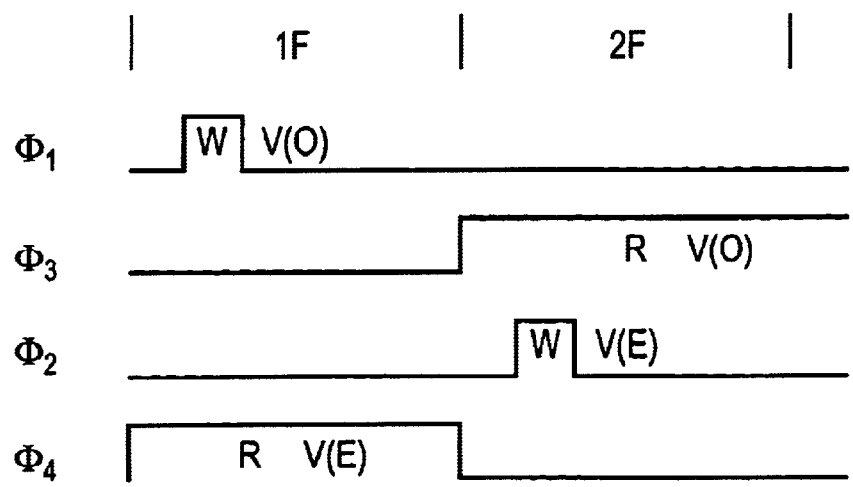
FIG. 2(B) is a timing chart showing the operation of the active element circuit.
Figure 3:
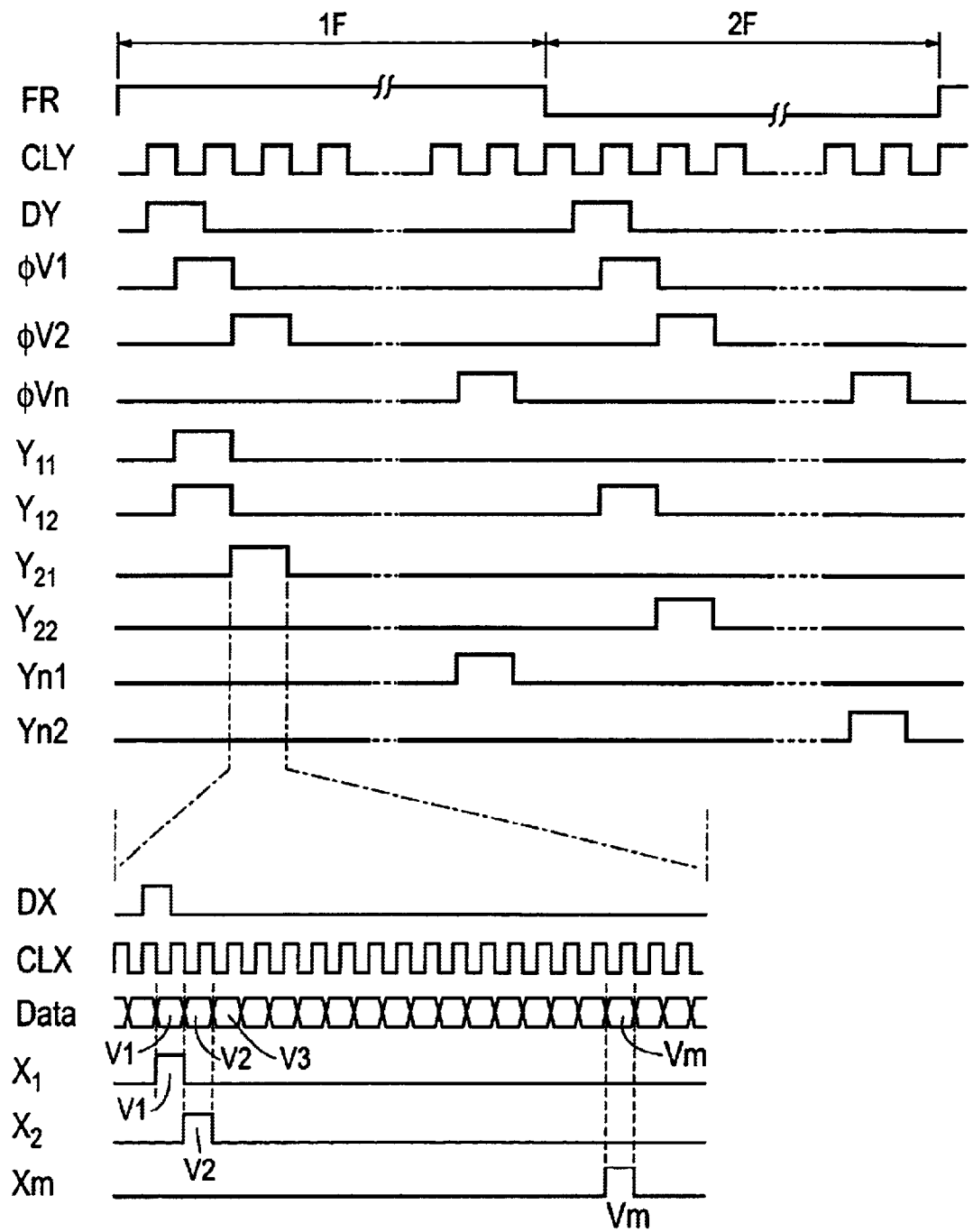
FIG. 3 is a timing chart showing the operation of the active-matrix liquid-crystal display element drive circuit of the first embodiment.

FIG. 1 is a circuit diagram showing an active-matrix liquid-crystal display element drive circuit embedded in a panel substrate as a reflective liquid-crystal display panel of a first embodiment of the present invention, FIG. 2(A) is a circuit diagram showing an active element circuit in the first embodiment, FIG. 2(B) is a timing chart showing the operation of the active element circuit, and FIG. 3 is a timing chart showing the operation of the active-matrix liquid-crystal display element drive circuit of the first embodiment.

In the reflective liquid-crystal display panel substrate of this embodiment, active elements and capacitive elements are embedded in a major surface of a large-size monocrystal semiconductor substrate (as large as 20 mm by 20 mm, for example), interlayer insulators and electrically conductive layers are alternately deposited on these elements, and a matrix of large number of rectangular pixels (reflective electrodes) 14 are arranged in a pixel area that occupies a major portion of the area of the substrate in a plan view.

Referring to FIG. 1, an active-matrix liquid-crystal display element drive circuit 50 includes an active matrix circuit 51 embedded right beneath the pixel area of the semiconductor substrate, a signal line drive circuit (an X driver) 52 for sending serially incoming display data signal (Data) to signal electrodes (X) $X_1$–$X_m$, each connected to a column of pixels in the active matrix circuit 51, and a scanning line drive circuit (a Y driver) 53 for sending selection timing signals to four scanning electrodes $Y_1$ ($Y_{11}$–$Y_{n1}$), $Y_2$ ($Y_{12}$–$Y_{n2}$), $Y_3$ ($Y_{13}$–$Y_{n3}$), and $Y_4$ ($Y_{14}$–$Y_{n4}$) per row of pixels to select a row of pixels in the active matrix circuit 51. The signal line drive circuit 52 and the scanning line drive circuit 53 form a peripheral circuit.

As in the conventional art, the signal line drive circuit 52 includes a pixel signal sampling circuit 52a having n switching elements (MOSFETs) connected in parallel to successively divide the serial display data signal (Data) among the signal electrodes $X_1$–$X_m$ every pixel selection period, and a signal line shift register (an X shift register) 52b for successively generating switch drive timing pulses $\phi H_1$–$\phi H_m$ for the switching elements based on a shift clock CLX and a latch pulse DX. As in the conventional art, the scanning line drive circuit 53 includes a scanning shift register (a Y shift register) 53a for successively generating row drive timing pulses $\phi_{V1}$–$\phi_{Vn}$ for the rows of pixels based on the shift clock CLY and a scanning start pulse (a frame start pulse) DY, and a selection timing circuit 53b for generating selection timing pulses $\Phi_1$–$\Phi_4$ for selecting one of the four scanning electrodes $Y_1$, $Y_2$, $Y_3$, and $Y_4$ for each row of pixels, based on the row drive timing pulses $\phi_{V1}$–$\phi_{Vn}$ and a liquid-crystal AC driving signal (a signal alternating every frame period) FR.

The active matrix circuit 51 has an active element circuit 55, shown in FIG. 2(A), embedded at each of the intersections of the signal electrodes X extending in the direction of columns and the scanning electrodes Y extending in the direction of rows. The active element circuit 55 includes a sample-and-hold circuit 56 that samples and holds, alternately, the odd frame signal V(O) and the even frame signal V(E) of the pixel signal V sent to the signal electrode X, and a pixel drive circuit 57 that alternately reads the odd frame signal V(O) and the even frame signal V(E) from the sample-and-hold circuit 56 every frame switching and drives a pixel electrode 14 in voltage driving.

The sample-and-hold circuit 56 includes a first sample-and-hold circuit 56a and a second sample-and-hold circuit 56b. The first sample-and-hold circuit 56a includes a first N MOSFET (gate-insulated field effect transistor) $T_1$ having the source S thereof electrically connected to the signal electrode X and the gate G thereof electrically connected to the first scanning electrode $Y_1$, and a first storage capacitor $C_1$ connected to the drain D of the MOSFET $T_1$. The second sample-and-hold circuit 56b has a similar construction, and includes a second N MOSFET ($T_2$) having the source S thereof electrically connected to the signal electrode X and the gate G thereof electrically connected to the second scanning electrode $Y_2$, and a second storage capacitor $C_2$ connected to the drain D of the MOSFET $T_2$.

The pixel drive circuit 57 of this embodiment includes a third N MOSFET ($T_3$) having the source S thereof electrically connected to the first storage capacitor $C_1$ and the gate G thereof electrically connected to a third scanning electrode $Y_3$, a fourth N MOSFET ($T_4$) having the source S thereof electrically connected to the second storage capacitor $C_2$ and the gate G thereof electrically connected to a fourth scanning electrode $Y_4$, and a fifth N MOSFET ($T_5$) having the gate G thereof electrically connected to the drains D of the third MOSFET ($T_3$) and the fourth MOSFET ($T_4$), the drain D thereof electrically connected to a pixel drive power source $V_{dd}$, and the source S thereof electrically connected to the pixel electrode 14. The third MOSFET ($T_3$) and the fourth MOSFET ($T_4$) form signal reading means that alternately reads the odd frame signal V(O) from the first storage capacitor $C_1$ and the even frame signal V(E) from the second storage capacitor $C_2$ at each frame switching. The fifth MOSFET ($T_5$) forms common pixel drive means that applies the pixel drive voltage $V_{dd}$ to the pixel electrode 14 in response to the read odd frame signal V(O) and the read even frame signal V(E). The active-matrix liquid-crystal display element drive circuit 50 finds use in both analog driving and digital driving.

The selection timing circuit 53b, the construction of which will be discussed later, generates the selection timing pulses $\Phi_1$–$\Phi_4$ as shown in FIG. 2(B). When the first write timing pulse $\Phi_1$ is generated on the first scanning electrode $Y_1$ during the odd frame period 1F, the first MOSFET ($T_1$) of the first sample-and-hold circuit 56a conducts, sampling the odd frame signal V(O) on the signal electrode X and writing the signal V(O) onto the first storage capacitor $C_1$. During the even frame period 2F in immediate succession to the odd frame period 1F, the second write timing pulse $\Phi_2$ is generated on the second scanning electrode $Y_2$, and the second MOSFET ($T_2$) of the second sample-and-hold circuit 56b conducts, sampling the even frame signal V(E) on the signal electrode X and writing the signal V(E) onto the second storage capacitor $C_2$. The odd frame signal V(O) is written onto the first storage capacitors $C_1$ in the active element circuits 55 of all pixels in a point-at-a-time manner during the odd frame period 1F. The even frame signal V(E) is written onto the second storage capacitors $C_2$ in the active element circuits 55 of all pixels during the even frame period 2F in a point-at-a-time manner. Concurrently with the alternating writing operation every frame period, the second write timing pulse $\Phi_4$ is continuously generated on the fourth scanning electrode $Y_4$ throughout the odd frame period 1F. The fourth MOSFET ($T_4$) conducts, reading the even frame signal V(E) temporarily stored in the second storage capacitor $C_2$. The fifth MOSFET ($T_5$) becomes conductive through the on resistance in response to the even frame signal V(E). A liquid crystal LC electrically connected to the pixel electrode 14 is thus driven. Throughout the even frame period 2F, the first write timing pulse $\Phi_3$ is continuously generated on the third scanning electrode $Y_3$, and the third MOSFET $T_3$) conducts, reading the odd frame signal V(E) temporarily stored in the first storage capacitor $C_1$. The fifth MOSFET ($T_5$) becomes conductive through the on resistance in response to the even frame signal V(O). The liquid crystal LC electrically connected to the pixel electrode 14 is thus driven.

Although the write method in this embodiment is a point-at-a-time scanning method, the sequence of writing is effective only in the sample-and-hold circuit 56, and is not pronounced in actual pixel driving. For this reason, the display is presented with the frame alternating on all pixels, thereby being free from non-uniformity. A large-size display screen or high-definition display screen results regardless of the number of pixels. Since concurrent still image presentation of the prior frame is performed on all pixels prior to the subsequent frame sample-and-hold operation, the display time and the write time are not exclusive to each other. The display time is allowed to be longer than that in the conventional art. A higher definition display is thus provided. With a longer write time, a slower signal transfer speed of the display data (Data) is possible, and the peripheral circuits are simplified in construction. A frame memory for display data attached external to the electrooptical device substrate is dispensed with. The use of a high number of pixels may be achieved.

Referring to FIG. 1, the selection timing circuit 53b for generating the selection timing pulses $\Phi_1$–$\Phi_4$ as shown in FIG. 2(B), includes an inverter INV for inverting a liquid crystal AC driving signal FR every frame, and in each row of pixels, an AND gate A1 for receiving the row drive timing pulses $\phi_V$ ($\phi_{V1}$–$\phi_{Vn}$) as one input from the scanning shift register 53a and the liquid crystal AC driving signal FR as the other input, and an AND gate A2 for receiving the row drive timing pulses $\phi_V$ ($\phi_{V1}$–$\phi_{Vn}$) as one input from scanning shift register 53a and the inverter output (FR bar) as the other input. The output of the AND gate A1 is fed to the first scanning electrode $Y_1$, the output of the AND gate A2 is fed to the second scanning electrode $Y_2$, the inverter output (FR bar) is fed to the third scanning electrode $Y_3$, and the AC driving signal FR is fed to the fourth scanning electrode $Y_4$. The two AND gates A1 and A2 correspond to a scanning electrode selecting circuit which alternately selects between the first scanning electrode $Y_1$ and the second scanning electrode $Y_2$ every frame period.

When the liquid crystal AC driving signal FR rises during the odd frame period 1F as shown in FIG. 3, the second read timing pulse $\Phi_4$ is generated. The fourth MOSFET ($T_4$) in each of the active element circuits 55 conducts while the first read timing pulse $\Phi_3$ disappears, causing the third MOSFET ($T_3$) to be nonconductive. During the odd frame period 1F, the row drive timing pulse $\phi_{V1}$–$\phi_{Vn}$ are successively generated from the Y shift register 53a. During the odd frame period 1F, the AND gate A1 for the first row of pixels is turned on in response to the row drive timing pulse $\phi_{V1}$ at a high level generated for the first pixel row and the liquid crystal AC driving signal FR at a high level. The first write timing pulse $\Phi_1$ is generated, causing the first MOSFET ($T_1$) to be conductive. Similarly, the row drive timing pulses $\phi_{V2}$–$\phi_{Vn}$ are successively generated for each horizontal period. For each row of pixels, the first write timing pulse $\Phi_1$ is generated, causing the first MOSFET ($T_1$) to be conductive.

In a horizontal period in which the first write timing pulse $\Phi_1$ for the second row of pixels is generated, the X shift register 52b successively generates the switch drive timing pulses $\phi_{H1}$–$\phi_{Hm}$ in synchronization with the shift clock CLX. The sampling circuit 52a serial-to-parallel converts the serial display data signal (Data), distributing pixel signals V1–Vm among signal electrodes $X_1$–$X_m$ on a column by column basis. Next, when the switch drive timing pulse $\phi_{H1}$ is generated, the pixel signal V1 on the signal electrode $X_1$ is written to the first storage capacitor $C_1$ through the first MOSFET ($T_1$) of the active element circuit 55 in the first column and the second row. When the switch drive timing pulse $\phi_{H2}$ is generated, the pixel signal V2 on the signal electrode $X_2$ is written to the first storage capacitor $C_1$ through the first MOSFET ($T_1$) of the active element circuit 55 in the second column and the second row. Finally, when the switch drive timing signal $\phi_{Hm}$ is generated, the pixel signal Vm on the signal electrode $X_m$ is written to the first storage capacitor $C_1$ through the first MOSFET ($T_1$) of the active element circuit 55 in the second row and the m-th column.

The pixel signal V(O) in the odd frame has been written to the first storage capacitors $C_1$ of all active element circuits 55 in a point-at-a-time manner in this way. During the next even frame period 2F, the liquid crystal AC driving signal FR falls. The first read timing pulse $\Phi_3$ is generated, causing the third MOSFET ($T_3$) of each active element circuit 55 to be conductive, and the second write timing pulse $\Phi_4$ disappears, causing the fourth MOSFET ($T_4$) to become nonconductive. Pixel signals V1–Vm that have been written in the first storage capacitors $C_1$ in all active element circuits 55 during the odd frame period 1F are read through the fourth MOSFET ($T_4$), and the fifth MOSFET ($T_5$) becomes conductive or nonconductive in response to the pixel signals V1–Vm in each row. The liquid-crystal cells LC electrically connected to the pixel electrodes 14 are thus concurrently driven.

Referring to FIG. 3, the row drive timing pulses $\phi_{V1}$–$\phi_{Vn}$ are successively generated from the Y shift register 53a during the even frame period 2F. During the even frame period 2F, the AND gate A2 is turned on in response to the row drive timing pulse $\phi_{V1}$ at a high level generated for the first row of pixels and the inverter output (FR bar) at a high level. The second write timing pulse $\Phi_2$ is generated, causing the second MOSFET ($T_2$) to become conductive. The first MOSFET ($T_2$) becomes nonconductive. Similarly, each time the row drive timing pulses $\phi_{V2}$–$\phi_{Vn}$ are successively generated every horizontal period, the second write timing pulse $\Phi_2$ is generated in each row, causing the second MOSFET ($T_2$) to become conductive.

In a horizontal period within which the second write timing pulse $\Phi_2$ for the second row of pixels is generated, the X shift register 52b successively generates the switch drive timing pulses $\phi_{H1}$–$\phi_{Hm}$ in synchronization with the shift clock CLX. The sampling circuit 52a serial-to-parallel converts the serial display data signal (Data), distributing pixel signals V1–Vm among signal electrodes $X_1$–$X_m$ on a column by column basis. The pixel signals V1–Vm on the signal lines $X_1$–$X_m$ are written to the storage capacitors $C_2$ through the second MOSFETs ($T_2$) in a point-at-a-time manner because the second MOSFETs ($T_2$) in all pixels in the second row are conductive throughout the horizontal period. The pixel signals V1–Vm in each row in the even frame are concurrently read during the next odd frame period, concurrently driving all pixels.

Second Embodiment

Figure 4:
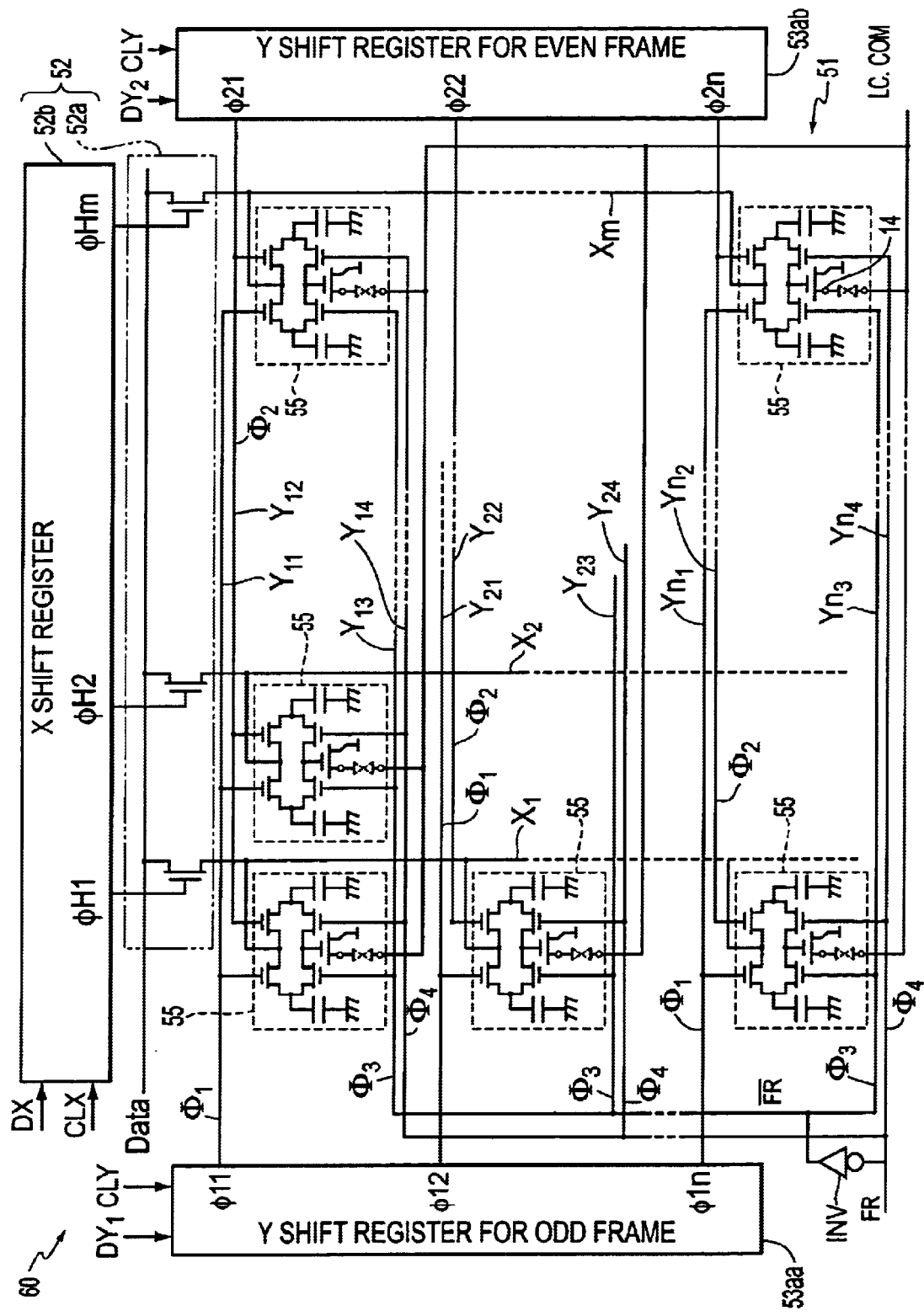
FIG. 4 is a circuit diagram showing an active-matrix liquid-crystal display element drive circuit embedded in a panel substrate as a reflective liquid-crystal display panel of a second embodiment of the present invention.

FIG. 4 is a circuit diagram showing an active-matrix liquid-crystal display element drive circuit embedded in a panel substrate as a reflective liquid-crystal display panel of a second embodiment of the present invention. In FIG. 4, components identical to those described in connection with the first embodiment are designated with the same reference numerals, and the discussion thereabout is omitted here.

In the reflective liquid-crystal display panel substrate of this embodiment, active elements and capacitive elements are embedded in a major surface of a large-size monocrystal semiconductor substrate (as large as 20 mm by 20 mm, for example), interlayer insulators and electrically conductive layers are alternately deposited on these elements, and a matrix of large number of rectangular pixels (reflective electrodes) 14 are arranged in a pixel area that occupies a major portion of the area of the substrate in a plan view.

As in the first embodiment, an active-matrix liquid-crystal display element drive circuit 60 of this embodiment includes an active matrix circuit 51 and a signal line drive circuit (X driver) 52. A scanning line drive circuit has a construction that is slightly different from that of the counterpart thereof in the first embodiment. The second embodiment is identical to the first embodiment in that, among the four scanning electrodes $Y_1$, $Y_2$, $Y_3$, and $Y_4$ for each pixel row, the liquid crystal AC driving signal (the signal alternating every frame period) is used as the first read timing pulse $\Phi_3$ on the third scanning electrode $Y_3$, and in that the output (FR bar) into which the inverter INV has inverted the liquid crystal AC driving signal FR is used as the second read timing pulse $\Phi_4$.

A write timing circuit for generating the first write timing pulse $\Phi_1$ to be fed to the first scanning electrode $Y_1$ and the second write timing pulse $\Phi_2$ to be fed to the second scanning electrode $Y_2$ is different in construction from that in the first embodiment. The write timing circuit includes an odd-frame Y shift register 53aa for successively generating first write timing pulses $\phi_{11}$–$\phi_{1n}$ for respective pixel rows through the first scanning electrodes $Y_1$ during the odd frame period, in response to the shift clock CLY and an odd frame start pulse $DY_1$, and an even-frame Y shift register 53ab for successively generating second write timing pulses $\phi_{21}$–$\phi_{2n}$ for respective pixel rows through the second scanning electrodes $Y_2$ during the even frame period, in response to the shift clock CLY and an even frame start pulse $DY_2$.

The active-matrix liquid-crystal display element drive circuit 60 having the odd-frame Y shift register 53aa and the even-frame Y shift register 53ab also provides the same advantages as those of the first embodiment, since the manner of generation of the write timing pulses $\Phi_1$ and $\Phi_2$ for each pixel row remains unchanged from that in the first embodiment. Furthermore, since the shift speed in the Y shift register side can be varied, the interpolation process of an interlace signal is facilitated.

Third Embodiment

Figure 5:
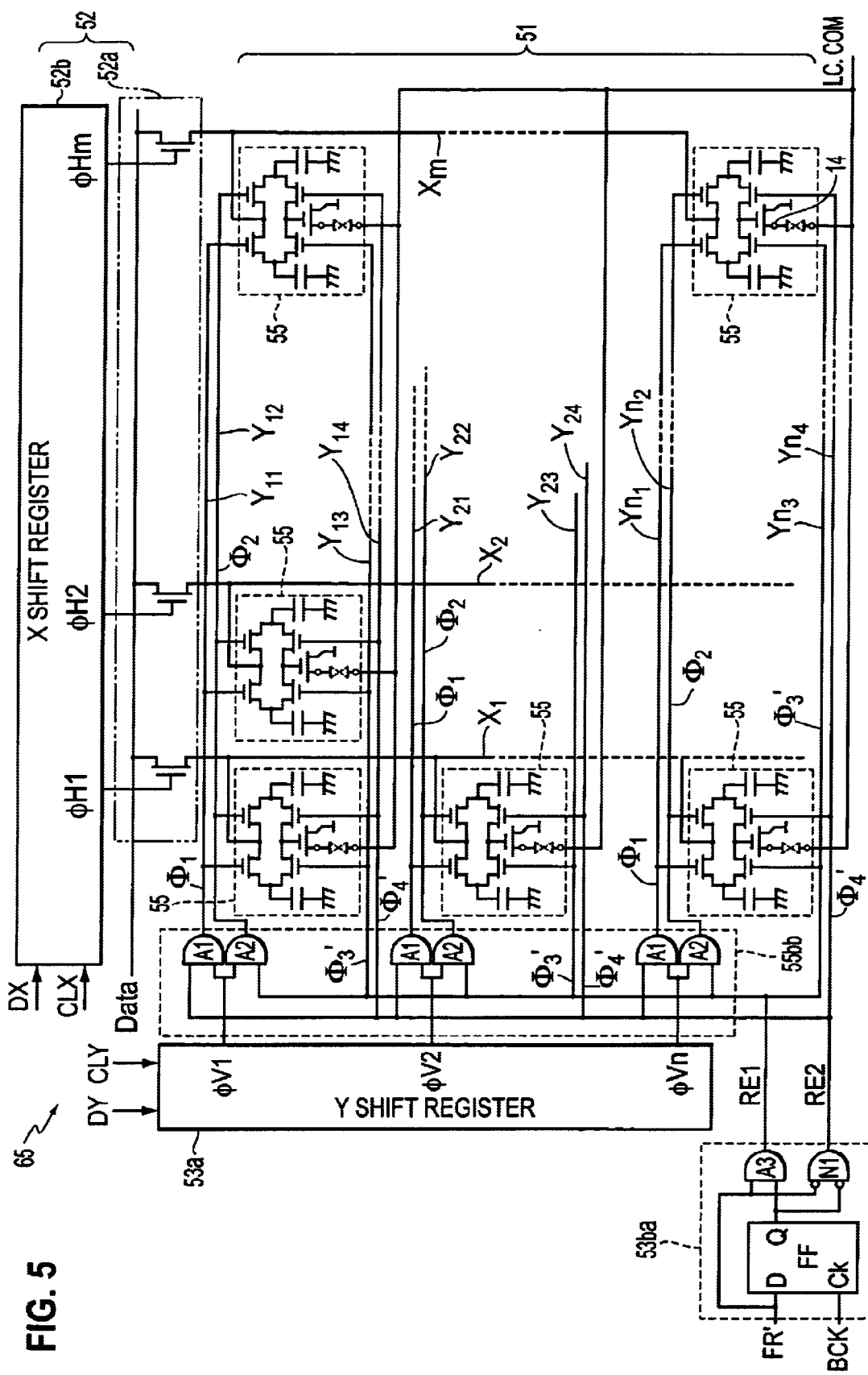
FIG. 5 is a circuit diagram showing an active-matrix liquid-crystal display element drive circuit embedded in a panel substrate as a reflective liquid-crystal display panel of a third embodiment of the present invention.
Figure 6:
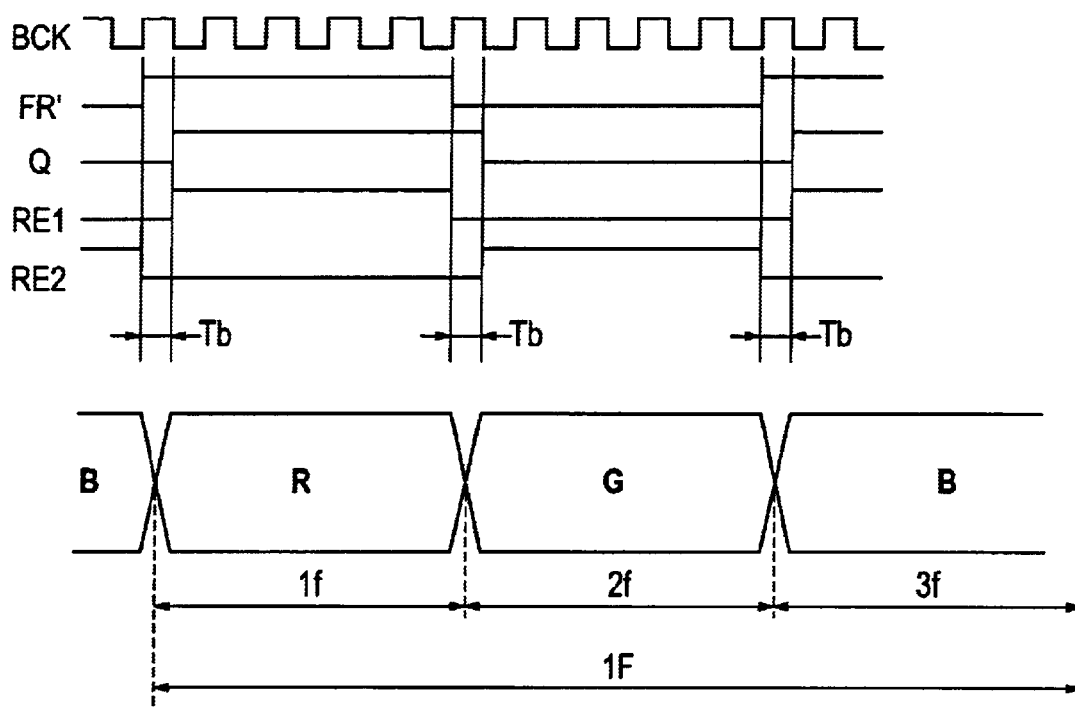
FIG. 6 is a timing chart explaining the operation of a timing circuit in the third embodiment.

FIG. 5 is a circuit diagram showing an active-matrix liquid-crystal display element drive circuit embedded in a panel substrate as a reflective liquid-crystal display panel of a third embodiment of the present invention, and FIG. 6 is a timing chart explaining the operation of a timing circuit in the third embodiment. In FIG. 5, components identical to those described in connection with the first embodiment are designated with the same reference numerals and the discussion thereabout is omitted here.

In the reflective liquid-crystal display panel substrate of this, embodiment, active elements and capacitive elements are embedded in a major surface of a large-size monocrystal semiconductor substrate (as large as 20 mm by 20 mm, for example), interlayer insulators and electrically conductive layers are alternately deposited on these elements, and a matrix of large number of rectangular pixels (reflective electrodes) 14 are arranged in a pixel area that occupies a major portion of the area of the substrate in a plan view.

As in the first embodiment, an active-matrix liquid-crystal display element drive circuit 65 of this embodiment includes an active matrix circuit 51, a signal line drive circuit (X driver) 52 and a Y shift register 53a. Since this embodiment adopts the color sequential display method (the field color successive presentation method), one full frame period includes R, G, and B subframe periods in succession. The scanning line drive circuit is thus slightly different from that in the first embodiment.

In the first embodiment, the read timing circuit is the inverter INV for inverting the liquid crystal AC driving signal FR that alternates every (full) frame. In this embodiment, however, a read idle timing circuit 53ab is particularly arranged. The read idle timing circuit 53ab includes a D flipflop (FF) that receives a blanking period setting clock BCK as a clock input CK and a liquid crystal AC driving signal FR', alternating each subframe period, as a data input D, an AND gate A3 that receives the liquid crystal AC driving signal FR' and the output Q of the D flipflop (FF) as the inputs thereof, and a NOR gate N1.

Since the display data signal (Data) is serially transferred in the sequence of the R subframe, the G subframe, and the B subframe, the active element circuit 55 performs, as shown in FIG. 6, a write operation for the G subframe during the read and driving period for the R subframe, a write operation for the B subframe during the next read and driving period for the G subframe, and a write operation for the R subframe during the next read and driving period for the B subframe.

The blanking period setting clock BCK and the liquid crystal AC driving signal FR' that alternates every subframe are fed to the D flipflop (FF). When the liquid crystal AC driving signal FR' rises, the output Q of the D flipflop (FF)

rises with a delay of a blanking period Tb from the rising edge of the liquid crystal AC driving signal FR'. An output RE2 of the NOR gate N1 falls in synchronization with the rising edge of the liquid crystal AC driving signal FR' and an output RE1 of the AND gate A3 rises in synchronization with the rising edge of the output Q. The output RE1 is fed to a gate of the third MOSFET ($T_3$) through the third scanning electrode $Y_3$ as a first read timing pulse $\Phi_3$', and the output RE2 is fed to a gate of the fourth MOSFET ($T_4$) through the fourth scanning electrode $Y_4$ as a second read timing pulse $\Phi_4$'. The third MOSFET ($T_3$) becomes conductive after the blanking period Tb from the nonconduction of the fourth MOSFET ($T_4$). With this arrangement, the fourth MOSFET ($T_4$) and the third MOSFET ($T_3$) become nonconductive at the frame switching, and the B signal and the R signal are free from mixing, and an additive color process is prevented during color light source switching.

When the liquid crystal AC driving signal FR' falls, the output Q of the D flipflop (FF) falls with the delay of Tb from the falling edge of the liquid crystal AC driving signal FR'. The output RE1 of the AND gate A3 falls in synchronization with the falling edge of the liquid crystal AC driving signal FR', and the output RE2 of the NOR gate N1 rises in synchronization with the falling edge of the output Q. The fourth MOSFET ($T_4$) becomes conductive after the blanking period Tb from the nonconduction of the third MOSFET ($T_3$). The fourth MOSFET ($T_4$) and the third MOSFET ($T_3$) concurrently become nonconductive at the subframe switching, the R signal and the G signal are free from mixing, and an additive color process is prevented during color light source switching. Similarly, the G signal and the B signal are free from mixing, and an additive color process is prevented during color light source switching.

Since the fourth MOSFET ($T_4$) and the third MOSFET ($T_3$) are put into conductive and nonconductive states in an exclusive manner with the blanking period Tb interposed between the two states, the two MOSFETs are not concurrently conductive. Not only the storage signals are mixed, but also the additive color process is prevented during color light source switching, and a high color image quality results. The read idle timing circuit 53ab may be employed in a system other that the field color successive presentation method. The fourth MOSFET ($T_4$) and the third MOSFET ($T_3$) are prevented from concurrently conducting during the frame switching, and thus the mixing of the storage signals is prevented at the frame switching.

This embodiment has the same advantages as those of the first embodiment.

Fourth Embodiment

Figure 7:
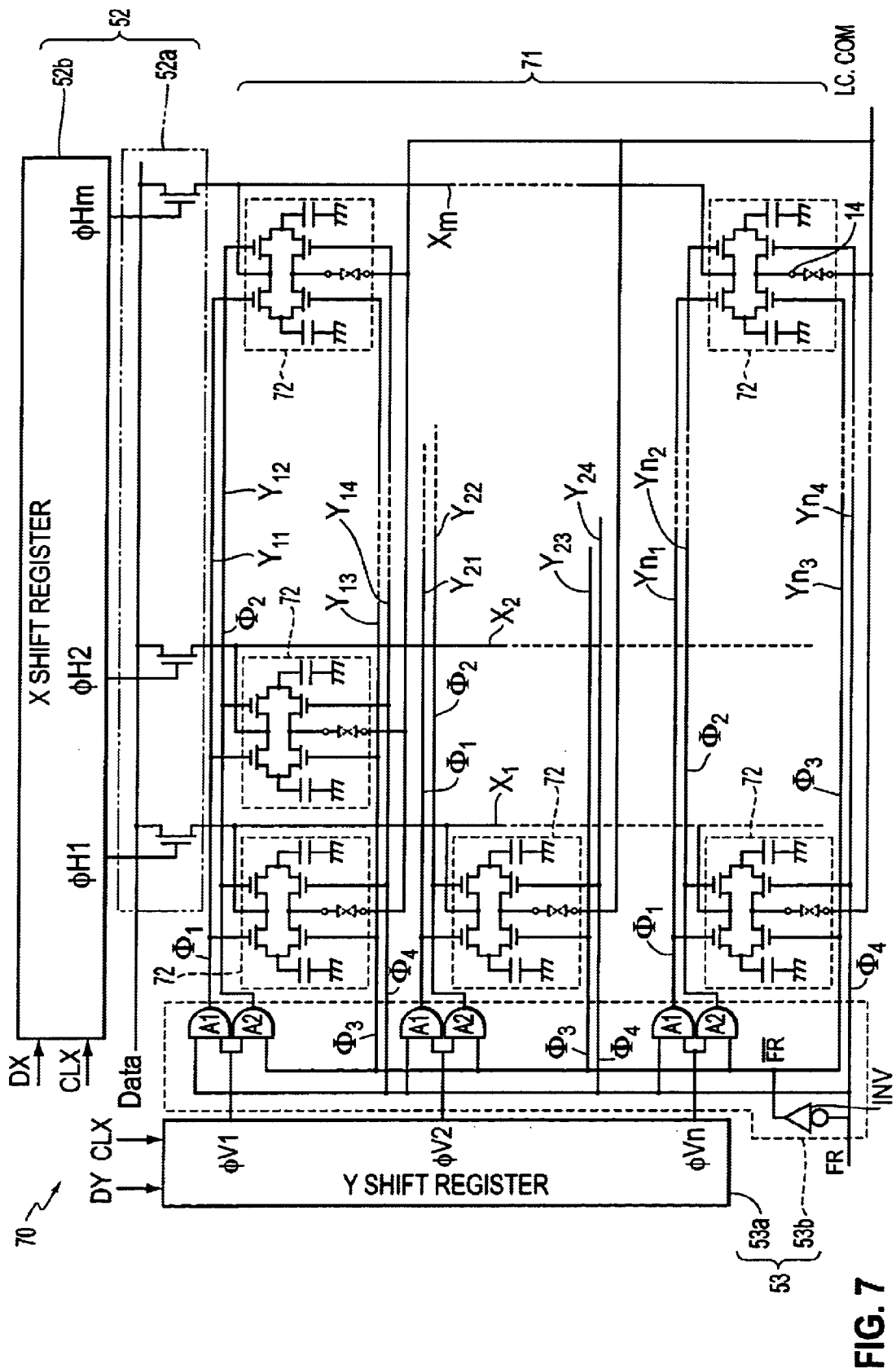
FIG. 7 is a circuit diagram showing an active-matrix liquid-crystal display element drive circuit embedded in a panel substrate as a reflective liquid-crystal display panel of a fourth embodiment of the present invention.
Figure 8A:
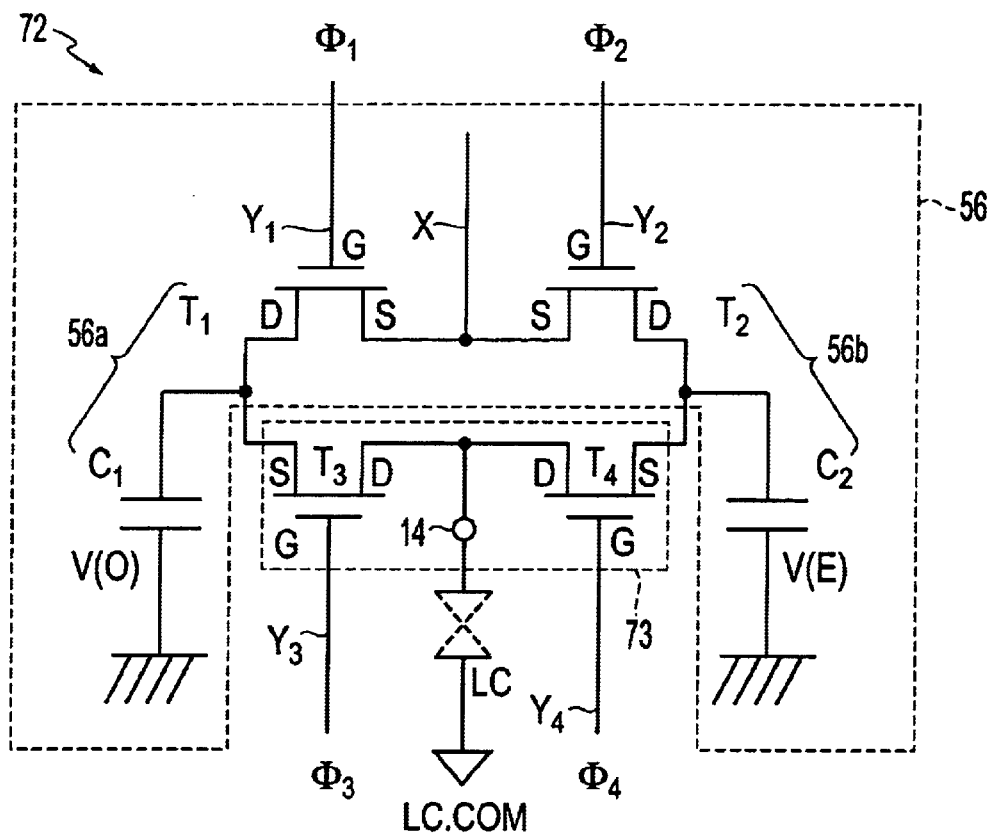
FIG. 8(A) is a circuit diagram showing an active element circuit in the fourth embodiment.
Figure 8B:
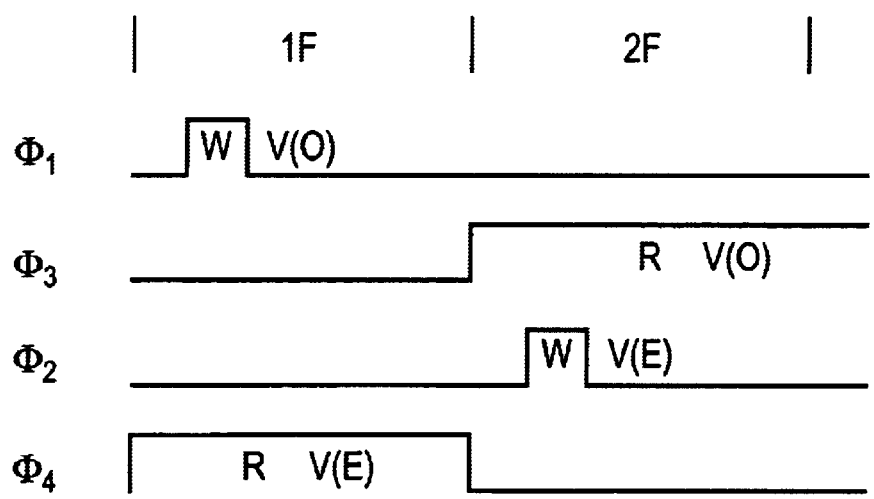
FIG. 8(B) is a timing chart explaining the operation of the active element circuit.

FIG. 7 is a circuit diagram showing an active-matrix liquid-crystal display element drive circuit embedded in a panel substrate as a reflective liquid-crystal display panel of a fourth embodiment of the present invention. FIG. 8(A) is a circuit diagram showing an active element circuit in the fourth embodiment, and FIG. 8(B) is a timing chart explaining the operation of the active element circuit. In FIG. 7, components identical to those described in connection with the first embodiment are designated with the same reference numerals and the discussion thereabout is omitted here.

In the reflective liquid-crystal display panel substrate of this embodiment, active elements and capacitive elements are embedded in a major surface of a large-size monocrystal semiconductor substrate (as large as 20 mm by 20 mm, for example), interlayer insulators and electrically conductive layers are alternately deposited on these elements, and a matrix of large number of rectangular pixels (reflective electrodes) 14 are arranged in a pixel area that occupies a major portion of the area of the substrate in a plan view.

As in the first embodiment, an active-matrix liquid-crystal display element drive circuit 70 of this embodiment includes a signal line drive circuit (X driver) 52 and a scanning line drive circuit 53. An active element circuit 72 is different from the active element circuit 55 in the first embodiment.

Referring to FIG. 8(A), the active element circuit 72 in an active-matrix circuit 71 includes a sample-and-hold circuit 56 for sampling and holding, alternately, the odd frame signal V(O) and the even frame signal V(E) of the pixel signal V sent to the signal electrode X, and a pixel drive circuit 73 for alternately reading the odd frame signal V(O) and the even frame signal V(E) from the sample-and-hold circuit 56 to voltage-drive the pixel electrode 14.

The sample-and-hold circuit 56 includes a first sample-and-hold circuit 56a and a second sample-and-hold circuit 56b. The first sample-and-hold circuit 56a includes a first N MOSFET ($T_1$) having the source S thereof electrically connected to the signal electrode X and the gate G thereof electrically connected to the first scanning electrode $Y_1$, and a first storage capacitor $C_1$ connected to the drain D of the MOSFET ($T_1$). The second sample-and-hold circuit 56b has a similar construction, and includes a second N MOSFET ($T_1$) having the source S thereof electrically connected to the signal electrode X and the gate G thereof electrically connected to the second scanning electrode $Y_2$, and a second storage capacitor $C_2$ electrically connected to the drain D of the second MOSFET.

The pixel drive circuit 73 of this embodiment includes a third N MOSFET ($T_3$) having the source S thereof electrically connected to the first storage capacitor $C_1$ and the gate G thereof electrically connected to a third scanning electrode $Y_3$, and the drain D thereof electrically connected to the signal electrode 14, and a fourth N MOSFET ($T_4$) having the source S thereof electrically connected to the second storage capacitor $C_2$ and the gate G thereof electrically connected to a fourth scanning electrode $Y_4$, and the drain D thereof electrically connected to the signal electrode 14. Although the pixel drive circuit 57 in the first embodiment includes the fifth N MOSFET ($T_5$), the pixel drive circuit 73 has no such MOSFET.

As shown in FIG. 8(B), in the active element circuit 72, the odd frame signal V(O) stored in the first storage capacitor $C_1$ during the odd frame period 1F is read by the third MOSFET ($T_3$) and is applied to the pixel electrode 14 during the even frame period 2F. The even frame signal V(E) stored in the second storage capacitor $C_2$ during the even frame period 2F is read by the fourth MOSFET ($T_4$) and is applied to the pixel electrode 14 during the odd frame period 1F. In this embodiment, in an alternate manner, the third MOSFET ($T_3$) works as pixel drive means for the even frame and the fourth MOSFET ($T_4$) works as pixel drive means for the odd frame. Since the fifth MOSFET ($T_5$) is not employed, the line for the active elements and the pixel drive power source $V_{dd}$ in the active-matrix circuit 71 are reduced, spacing for the elements is saved, and a high density pixel arrangement is thus achieved.

This embodiment also provides the same advantages as those of the first embodiment.

Fifth Embodiment

Figure 9:
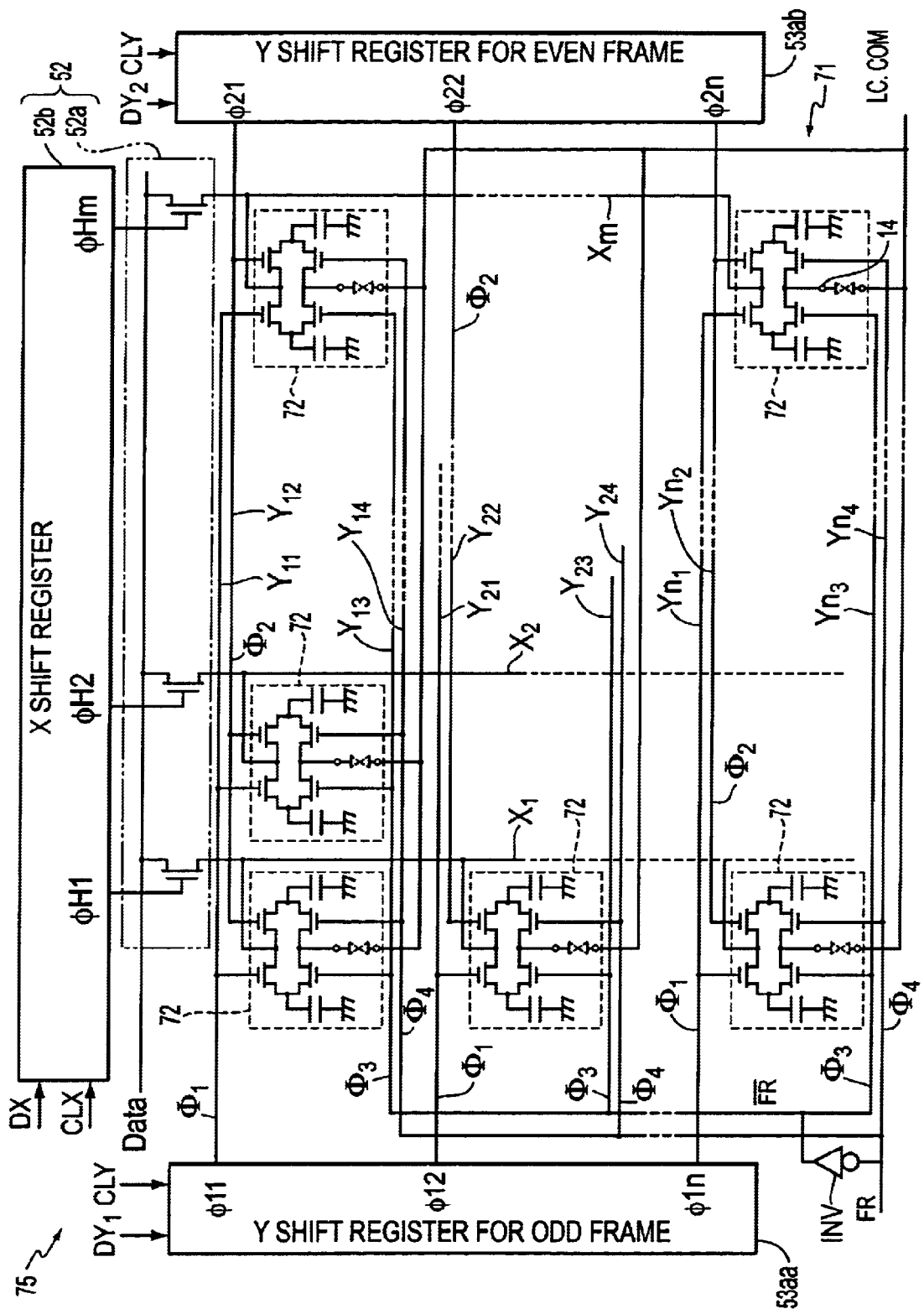
FIG. 9 is a circuit diagram showing an active-matrix liquid-crystal display element drive circuit embedded in a panel substrate as a reflective liquid-crystal display panel of a fifth embodiment of the present invention.

FIG. 9 is a circuit diagram showing an active-matrix liquid-crystal display element drive circuit embedded in a panel substrate as a reflective liquid-crystal display panel of a fifth embodiment of the present invention. In FIG. 9, components identical to those described in connection with the second and fourth embodiment are designated with the same reference numerals, and the discussion thereabout is omitted here.

In the reflective liquid-crystal display panel substrate of this embodiment, active elements and capacitive elements are embedded in a major surface of a large-size monocrystal semiconductor substrate (as large as 20 mm by 20 mm, for example), interlayer insulators and electrically conductive layers are alternately deposited on these elements, and a matrix of large number of rectangular pixels (reflective electrodes) 14 are arranged in a pixel area that occupies a major portion of the area of the substrate in a plan view.

As in the second embodiment shown in FIG. 4, an active-matrix liquid-crystal display element drive circuit 75 of this embodiment includes a signal line drive circuit (X driver) 52, an odd frame Y shift register 53aa, an even frame Y shift register 53ab, and an inverter INV, and further includes an active-matrix circuit 71 having an active element circuit 72 like the fourth embodiment shown in FIG. 7 and FIG. 8. This embodiment thus provides the same advantages as those of the second and fourth embodiment.

Sixth Embodiment

Figure 10:
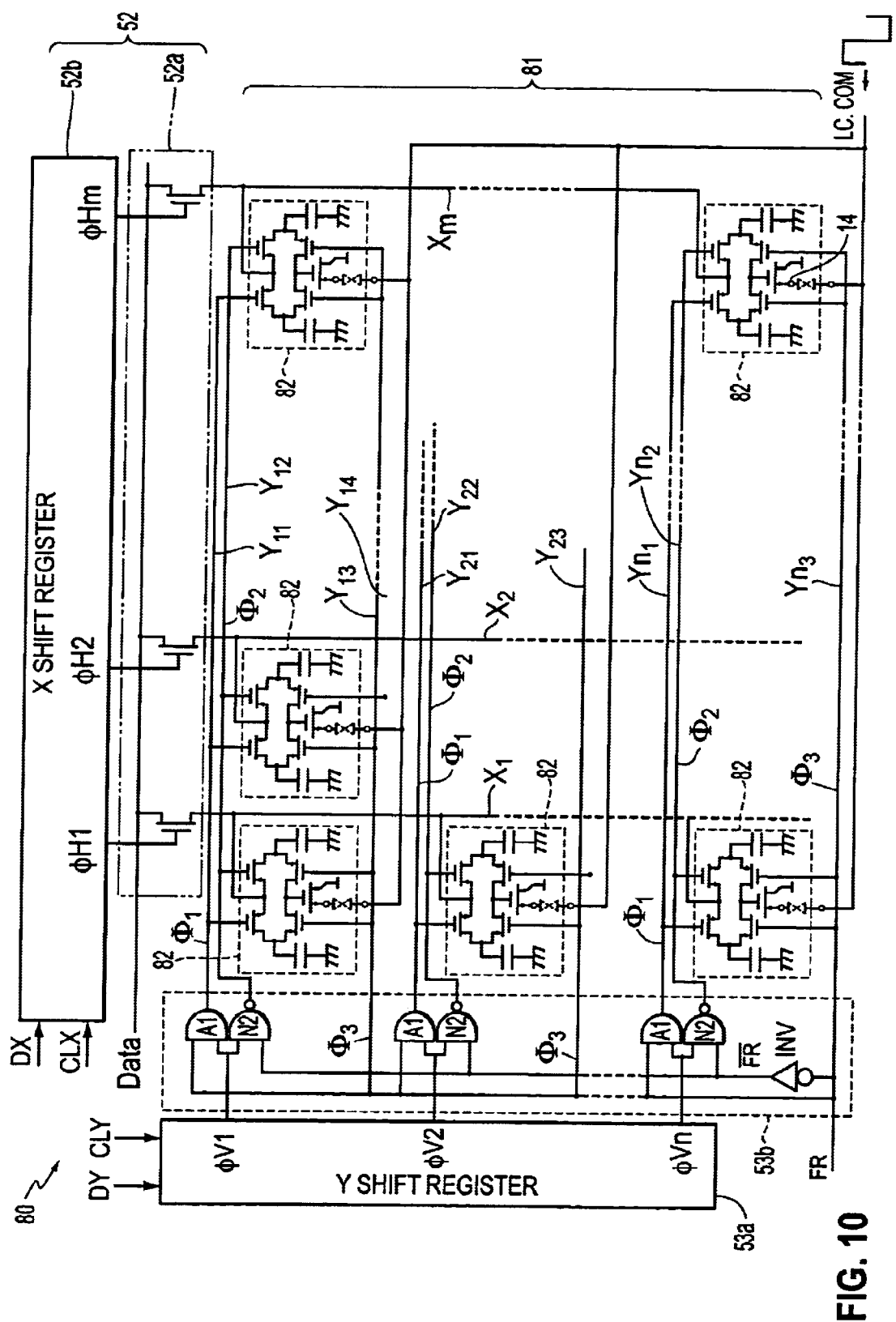
FIG. 10 is a circuit diagram showing an active-matrix liquid-crystal display element drive circuit embedded in a panel substrate as a reflective liquid-crystal display panel of a sixth embodiment of the present invention.
Figure 11A:
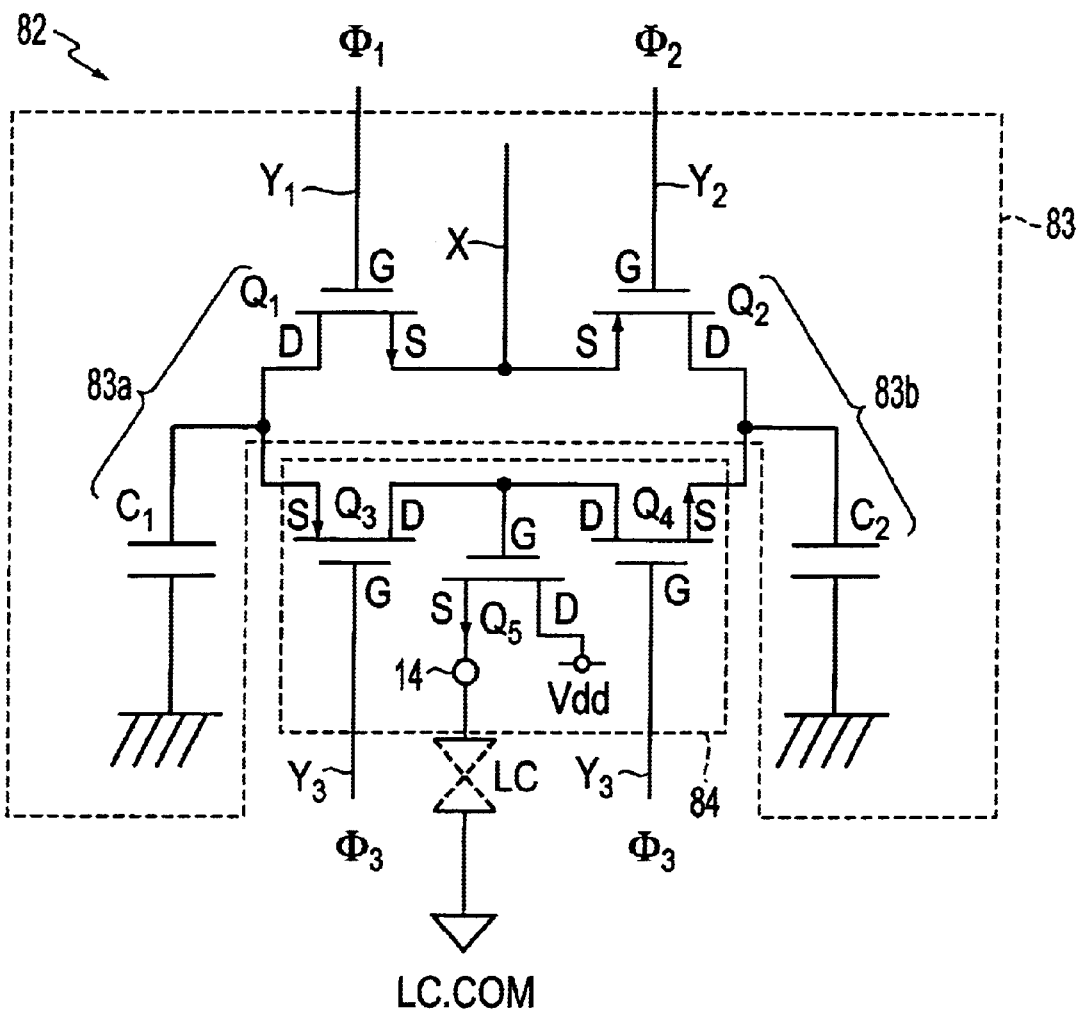
FIG. 11(A) is a circuit diagram showing an active element circuit in the sixth embodiment.
Figure 11B:
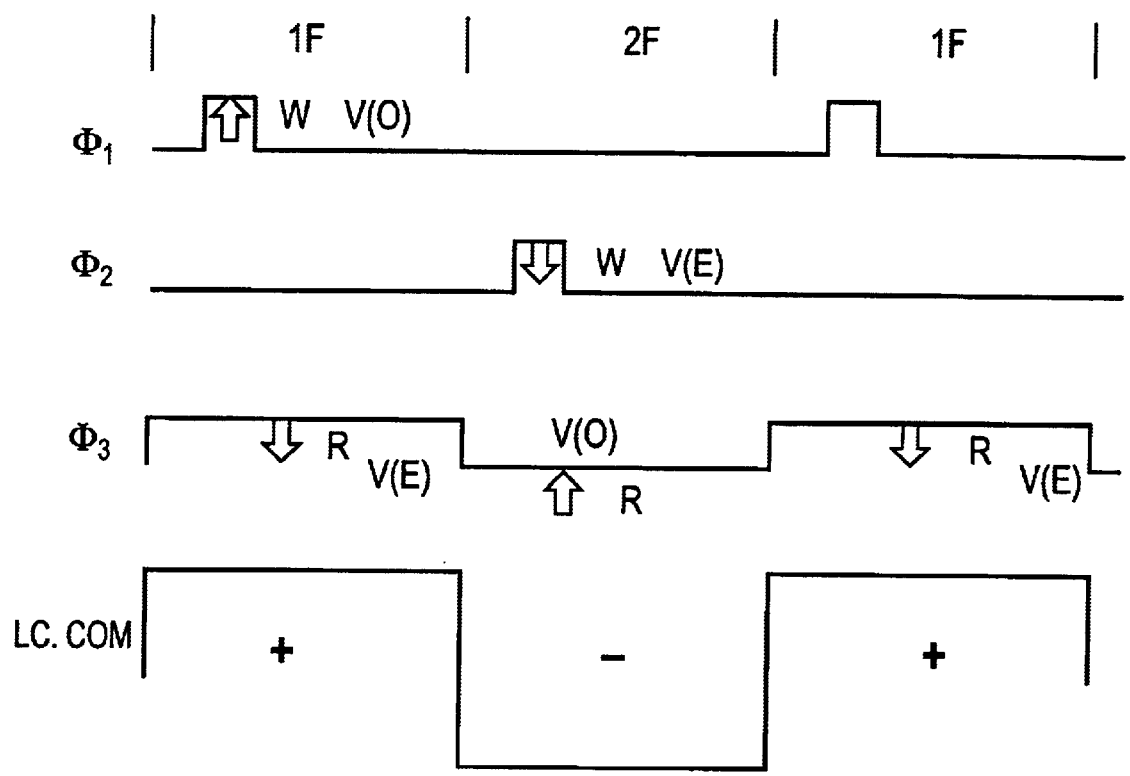
FIG. 11(B) is a timing chart explaining the operation of the active element circuit.

Fig. 10 is a circuit diagram showing an active-matrix liquid-crystal display element drive circuit embedded in a panel substrate as a reflective liquid-crystal display panel of a sixth embodiment of the present invention, FIG. 11(A) is a circuit diagram showing an active element circuit in the sixth embodiment, and FIG. 11(B) is a timing chart explaining the operation of the active element circuit. In FIG. 10, components identical to those described in connection with the first embodiment are designated with the same reference numerals, and the discussion thereabout is omitted here.

In the reflective liquid-crystal display panel substrate of this embodiment, active elements and capacitive elements are embedded in a major surface of a large-size monocrystal semiconductor substrate (as large as 20 mm by 20 mm, for example), interlayer insulators and electrically conductive layers are alternately deposited on these elements, and a matrix of large number of rectangular pixels (reflective electrodes) 14 are arranged in a pixel area that occupies a major portion of the area of the substrate in a plan view.

As in the first embodiment shown in FIG. 1, an active-matrix liquid-crystal display element drive circuit 80 of this embodiment includes a signal line drive circuit (X driver) 52 and a Y shift register 53a. An active element circuit 82 of an active-matrix circuit 81 is different in construction from the active element circuit 55 in the first embodiment. As shown in FIG. 11(A), the active element circuit 82 includes a sample-and-hold circuit 83 for sampling and holding, alternately, the odd frame signal V(O) and the even frame signal V(E) of the pixel signal V sent to the signal electrode X, and a pixel drive circuit 84 for alternately reading the odd frame signal V(O) and the even frame signal V(E) from the sample-and-hold circuit 83 to voltage-drive the pixel electrode 14.

The sample-and-hold circuit 83 includes a first sample-and-hold circuit 83a and a second sample-and-hold circuit 83b. The first sample-and-hold circuit 83a includes a first N MOSFET ($Q_1$) having the source S thereof electrically connected to the signal electrode X and the gate G thereof electrically connected to the first scanning electrode $Y_1$, and a first storage capacitor $C_1$ connected to the drain D of the MOSFET ($Q_1$). The second sample-and-hold circuit 83b has a similar construction, and includes a second P MOSFET ($Q_2$) having the source S thereof electrically connected to the signal electrode X and the gate G thereof electrically connected to the second scanning electrode $Y_2$, and a second storage capacitor $C_2$ electrically connected to the drain D of the second MOSFET. The first MOSFET ($Q_1$) and the second MOSFET ($Q_2$) are complementary in semiconductor type, and have a so-called CMOS structure. For this reason, the first write timing pulse $\Phi_1$ for the first MOSFET ($Q_1$) needs to be a rising pulse edge, and the second write timing pulse $\Phi_2$ for the second MOSFET ($Q_2$) needs to be a falling pulse edge. A write timing circuit 53b' of this embodiment includes a NAND gate N2 which replaces the AND gate A2 for the second scanning electrode $Y_2$ in the selection timing circuit 53b in FIG. 1.

On the other hand, the pixel drive circuit 84 includes a third N MOSFET ($Q_3$) having the source S thereof electrically connected to the first storage capacitor $C_1$ and the gate G thereof electrically connected to a third scanning electrode $Y_3$, a fourth N MOSFET ($Q_4$) having the source S thereof electrically connected to the second storage capacitor $C_2$ and the gate G thereof electrically connected to a third scanning electrode $Y_3$, and a fifth N MOSFET ($Q_5$) having the gate G thereof electrically connected to the drains D of the third MOSFET ($Q_3$) and the fourth MOSFET ($Q_4$), the drain D thereof electrically connected to a pixel drive power source $V_{dd}$, and the source S thereof electrically connected to the pixel electrode 14. The third MOSFET ($Q_3$) and the fourth MOSFET ($Q_4$) are complementary in semiconductor type, and is a so-called CMOS. The third MOSFET ($Q_3$) and the fourth MOSFET ($Q_4$) operate exclusively with the same polarity gate voltage respectively applied to the two gates thereof. The common read timing pulse $\Phi_3$ is applied to the two gates through the single signal scanning electrode $Y_3$. The number of lines of scanning electrodes per row of pixels is thus reduced by one.

In the first through fifth embodiments, the opposing electrode (common electrode) LC.COM on the transparent substrate side, assembled to be opposed to the reflective liquid-crystal display panel substrate, is maintained to a constant voltage. In this embodiment, a relatively high voltage, which alternates every frame, is applied to the opposing electrode.

For this reason, as shown in FIG. 11(B), the voltage of the opposing electrode LC.COM is positive during the odd frame period 1F, and a voltage difference between a relatively negative signal electrode voltage (voltage $V_{dd}$) and the voltage of the opposing electrode LC.COM on the positive side is substantially large, even if the power source voltage $V_{dd}$ is a low voltage when the fourth MOSFET ($Q_4$) becomes conductive, reading the storage signal, followed by the conduction of the fifth MOSFET ($Q_5$). During the even frame period 2F, the voltage of the opposing electrode LC.COM becomes negative, and a voltage difference between the voltage of the signal electrode at the positive side and the opposing electrode LC.COM at the negative side is substantially large when the third MOSFET ($Q_3$) becomes conductive, reading the storage signal, followed by the conduction of the fifth MOSFET ($Q_5$).

By alternating or swinging the voltage of the opposing electrode (common electrode) LC.COM every frame, the degradation of the liquid-crystal cell LC is prevented, and the dynamic range of the signal applied to the pixel electrode 14 is relatively reduced. The MOSFETs in the active element circuit 82 can be fabricated of low withstand-voltage ones. This permits fine structured elements to be implemented, leading to a reduced area size of the element.

A high-definition display apparatus with an increased aperture ratio thus results.

This embodiment has the same advantages as those of the first embodiment.

Seventh Embodiment

Figure 12:
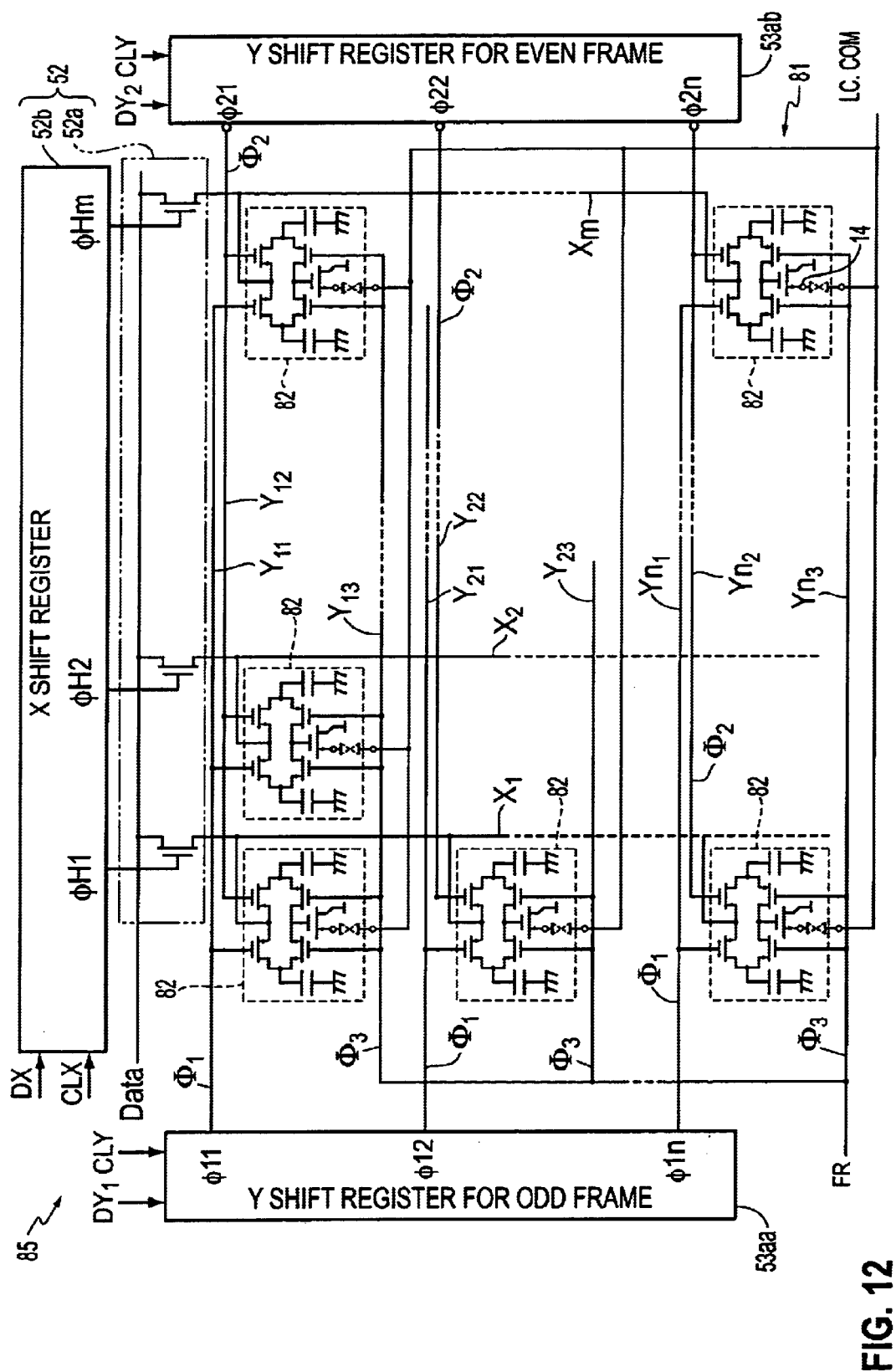
FIG. 12 is a circuit diagram showing an active-matrix liquid-crystal display element drive circuit embedded in a panel substrate as a reflective liquid-crystal display panel of a seventh embodiment of the present invention.

FIG. 12 is a circuit diagram showing an active-matrix liquid-crystal display element drive circuit embedded in a panel substrate as a reflective liquid-crystal display panel of a seventh embodiment of the present invention. In FIG. 12, components identical to those described in connection with the second and sixth embodiments are designated with the same reference numerals, and the discussion thereabout is omitted here.

In the reflective liquid-crystal display panel substrate of this embodiment, active elements and capacitive elements are embedded in a major surface of a large-size monocrystal semiconductor substrate (as large as 20 mm by 20 mm, for example), interlayer insulators and electrically conductive layers are alternately deposited on these elements, and a matrix of large number of rectangular pixels (reflective electrodes) 14 are arranged in a pixel area that occupies a major portion of the area of the substrate in a plan view.

As in the second embodiment, an active-matrix liquid-crystal display element drive circuit 85 of this embodiment includes a signal line drive circuit (X driver) 52, an odd frame Y shift register 53aa, an even frame Y shift register 53ab, and an inverter INV, and further includes an active-matrix circuit 81 having an active element circuit 82 as in the sixth embodiment shown in FIG. 10 and FIG. 11. This embodiment thus provides the same advantages as those of the second and sixth embodiments.

Eighth Embodiment

Figure 13:
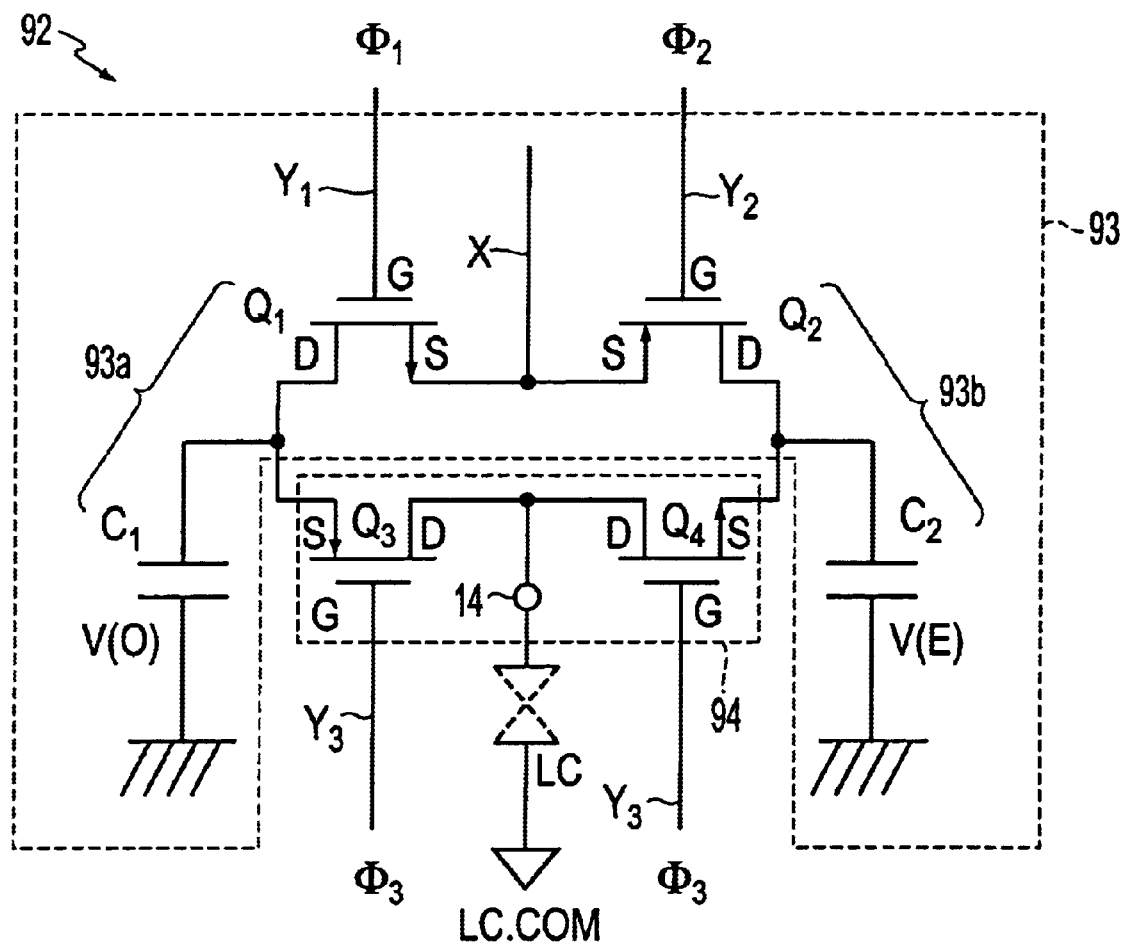
FIG. 13 is a circuit diagram showing an active-matrix liquid-crystal display element drive circuit embedded in a panel substrate as a reflective liquid-crystal display panel of an eighth embodiment of the present invention.

FIG. 13 is a circuit diagram showing an active-matrix liquid-crystal display element drive circuit embedded in a panel substrate as a reflective liquid-crystal display panel of an eighth embodiment of the present invention. In FIG. 13, components identical to those described with reference to FIG. 11 are designated with the same reference numerals, and the discussion thereabout is omitted here.

Although the general construction of the active-matrix liquid-crystal display element drive circuit is not presented in the discussion of this embodiment, this embodiment may use one of the construction of the sixth embodiment shown in FIG. 10 and the construction of the seventh embodiment shown in FIG. 12.

The pixel drive circuit 93 of an active element circuit 92 is identical to the construction of the pixel drive circuit 84 of the active element circuit 82 with the fifth MOSFET ($Q_5$) removed therefrom in FIG. 11(A). The third MOSFET ($Q_3$) alone forms the first pixel drive circuit and the fourth MOSFET ($Q_4$) alone forms the second pixel drive circuit. This arrangement is suited for analog driving of the pixels. The active element count is reduced, and the lines for the pixel drive power source $V_{dd}$ are reduced. Spacing for the elements is saved, and a high density pixel arrangement is thus achieved.

The voltage of the opposing electrode (common electrode) LC.COM is also swung in this embodiment as well. This embodiment offers the same advantages as those of the sixth embodiment. Furthermore, this embodiment provides the same advantages of the first embodiment.

The liquid-crystal display panels of the preceding embodiments are appropriate for use as a reflective liquid-crystal display panel. The liquid-crystal display panel may be incorporated not only in the light valve of the already described liquid-crystal projector, but also in the display unit for a portable information processing apparatus such as wrist-watch type electronic equipment, a wordprocessor, or a personal computer, the display unit for a portable telephone, and the display units for a diversity of electronic equipment.

In the liquid-crystal display panels of the preceding embodiments, the switching elements are embedded in the major surface of the semiconductor substrate. The substrate is not limited to the semiconductor substrate, and may be an insulator substrate such as a glass substrate or a quartz substrate. The present invention may be implemented when a thin-film transistor (TFT) is formed on the insulator substrate as a switching element.

The present invention finds use not only in the liquid-crystal display panel substrate but also in other flat display substrates.

As described above, the electrooptical device substrate of the present invention includes the delayed pixel driving active element circuit embedded in each of the pixels. The active element circuit temporarily stores the subsequent signal for the pixel during the driving duration of the same pixel by the prior signal to be on ready standby for the subsequent pixel driving for the next duration, rather than starting driving, at the timing of storing the signal from the signal electrode, the pixel in accordance with the same signal. The following advantages are thus provided.

(1) Regardless of the point-at-a-time scanning method or the line-at-a-time scanning method, the sequence of the writing of the pixels is merely the sequence of temporary storage, and not the sequence of the driving the pixels. The sequence of the writing is not pronounced as the sequence of the driving, and the concurrent switching of all pixels is performed. The problem of the non-uniformity on the display screen is resolved, and a high image quality electrooptical device substrate is thus provided. A large-size display screen or high-definition display screen results regardless of the number of pixels.

Since the delayed pixel driving active element circuit performs the pixel driving in response to the prior signal during the temporary storage of the subsequent signal, concurrent driving of all pixels (concurrent still image presentation) is performed for a constant duration (one frame period, for instance). Since the display time and the write time are not exclusive to each other, the display time is allowed to be longer than that in the conventional art. A higher definition display is thus provided. Since the delayed pixel driving active element circuit performs the temporary storage operation of the subsequent signal during the pixel driving period for the prior signal, the temporary storage operation for all pixels for the constant duration (one frame period, for instance) is achieved, permitting longer write time. With a slow signal transfer speed, the peripheral circuits are simplified in construction or modified to accommodate a higher number of pixels. A frame memory for display data attached external to the electrooptical device substrate is dispensed with.

(2) The delayed pixel driving active element circuit includes the plurality of sample-and-hold means that perform the temporary storage operation exclusively or successively in a time division manner to capture the signal from the signal electrode, and pixel drive means that performs the pixel drive operation exclusively or successively in a time division manner by reading the temporarily stored signal from the sample-and-hold means. It is sufficient if the sample-and-hold means is constructed of first and second sample-and-hold means. When N sample-and-hold means are used, the write duration of the subsequent signal is set to be (N−1) times the pixel drive duration for the prior signal. The effect of the simplification of the peripheral circuits and the use of a high number of pixels are substantial as a result of a slow signal transfer speed.

(3) The first sample-and-hold means includes first signal hold means and first signal writing means and the second sample-and-hold means includes the second signal hold means and second signal writing means. The use of the first signal writing means and the second signal writing means of the same semiconductor type controls differences in element characteristics, thereby providing advantages in analog driving.

(4) The construction of the peripheral circuit is simplified when the timing signal that alternates every frame is employed as the write timing means.

(5) The pixel drive means is composed of the first signal reading means, the second signal reading means, and the common pixel drive means. The use of the first signal reading means and the second signal reading means, fabricated of transistors of the same semiconductor type, controls differences in element characteristics, thereby providing advantages in analog driving.

(6) When the first signal reading means and the second signal reading means are fabricated of transistors complementary in semiconductor type, the two means become conductive or nonconductive in response to on/off control signals having complementary logics. The common single signal scanning electrode thus serves as a control line.

(7) Since the pixel drive means includes the first pixel drive means and the second pixel drive means, but includes no common pixel drive means, the counts of active elements and lines of the pixel drive power source in the active element circuit are accordingly reduced.

(8) The construction of the peripheral circuit is simplified when the timing signal that alternates every frame is employed as the read timing means.

(9) When the read timing means is read idle timing means which interposes a blanking period between the first read timing signal and the second read timing signal, the first pixel drive means and the second pixel drive means become nonconductive during the blanking period, and the prior signal and the subsequent signal are not mixed with each other. In the color sequential type display, in particular, an additive color process is prevented during the color light source switching, and a high color image quality results.

(10) When the first pixel drive means and the second pixel drive means are transistors having complementary semiconductor types, the two means become conductive and nonconductive exclusively to each other. The read idle timing means is thus dispensed with, and the construction of the peripheral circuit is simplified.

(11) When the signal on the signal electrode is an analog signal, the analog driving of the pixels is performed. When the signal on the signal electrode is a pulse-width-modulated signal, the digital driving of the pixels is performed.

(12) The electrooptical device is constructed by assembling the above-referenced electrooptical device substrate and an opposing transparent substrate, and by encapsulating an electrooptical material between the substrates. When the common voltage that alternates every frame period is applied to the opposing electrode of the transparent substrate, the electrooptical material is AC driven. Degradation of the liquid crystal is avoided, and the dynamic range of the signal applied to the pixel electrode is relatively reduced. Active elements in the active element circuit can be fabricated of low withstand-voltage ones. This permits fine structured elements to be implemented, leading to a reduced area size of the element. A high-definition display apparatus with an increased aperture ratio thus results.

(13) When such an electrooptical device is incorporated in a diversity of electronic equipment as a display unit, a high image quality display is presented. The electrooptical device is appropriate for use as a light valve in a projection display apparatus, for instance.

Ninth Embodiment

Figure 14:
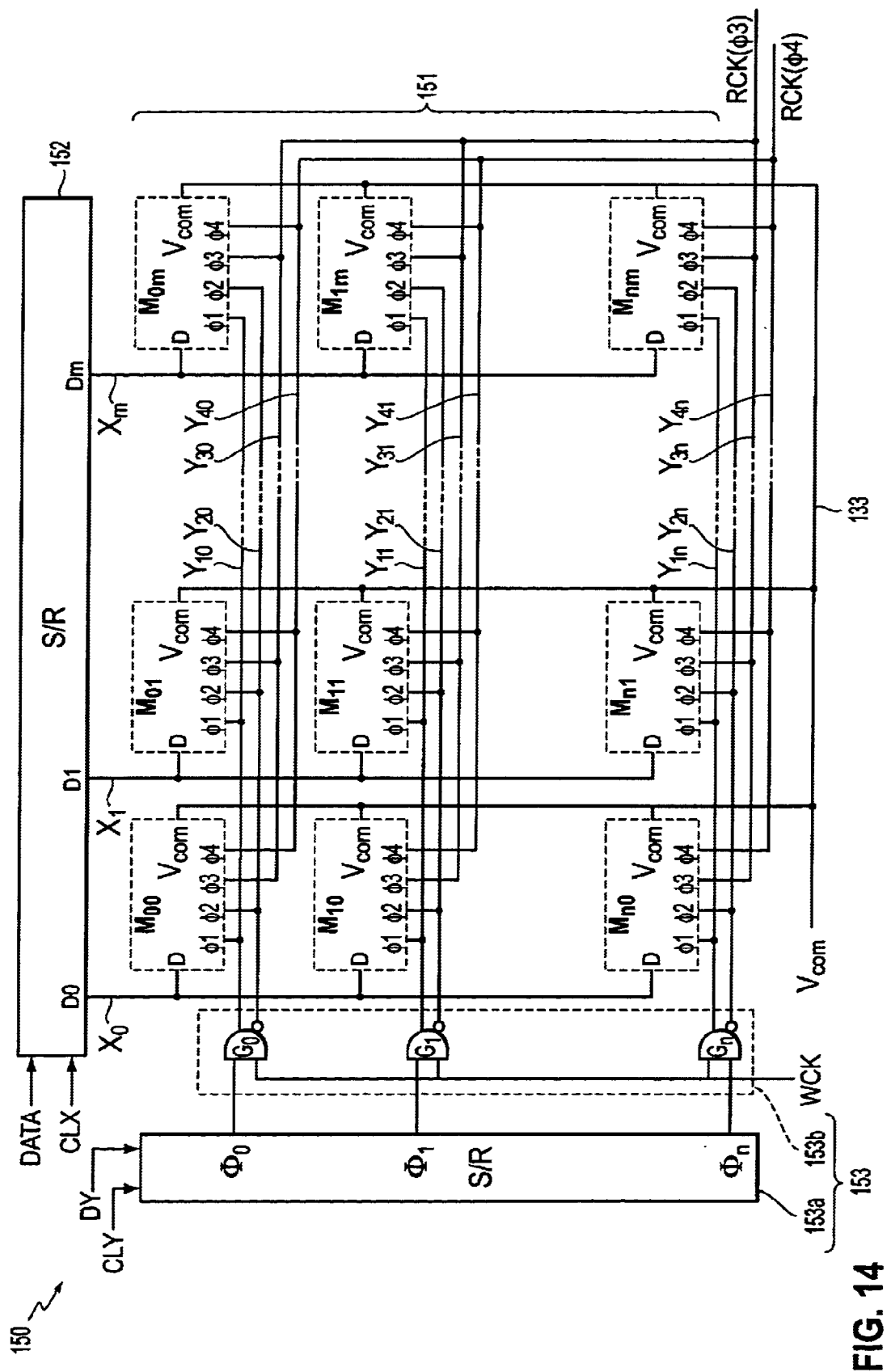
FIG. 14 is a circuit diagram showing a matrix liquid-crystal display element drive circuit arranged on the substrate of a reflective liquid-crystal display panel of a ninth embodiment of the present invention.
Figure 15A:
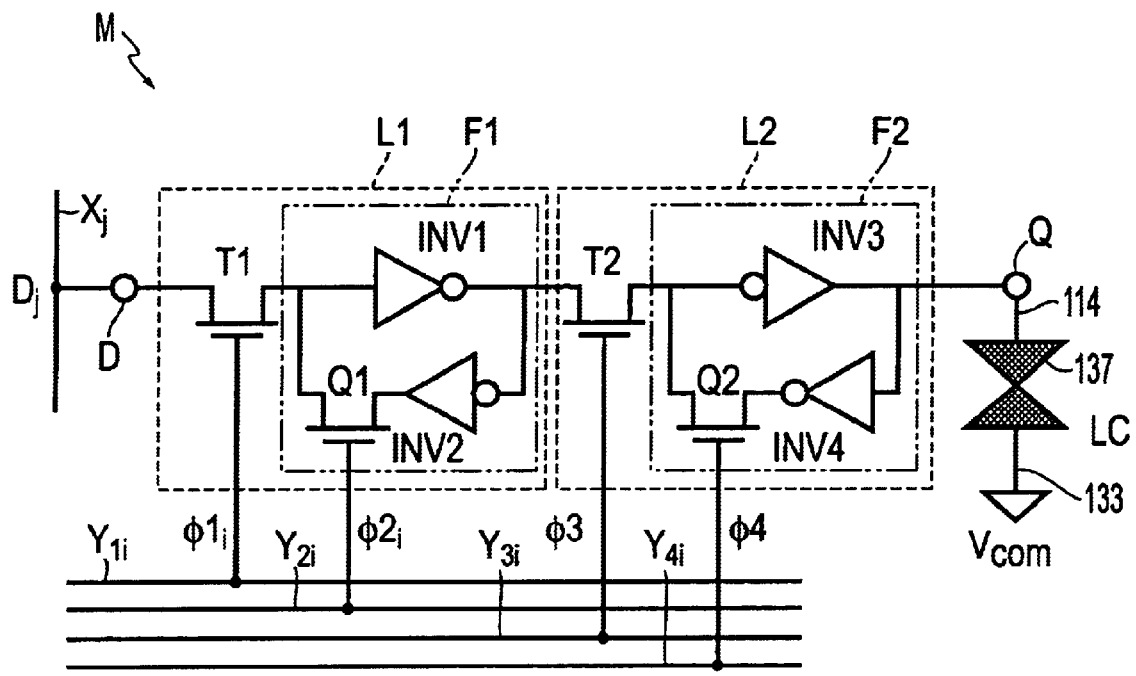
FIG. 15(A) is a circuit diagram of a digital storage circuit arranged for each pixel in the matrix liquid-crystal display element drive circuit of FIG. 14.
Figure 15B:
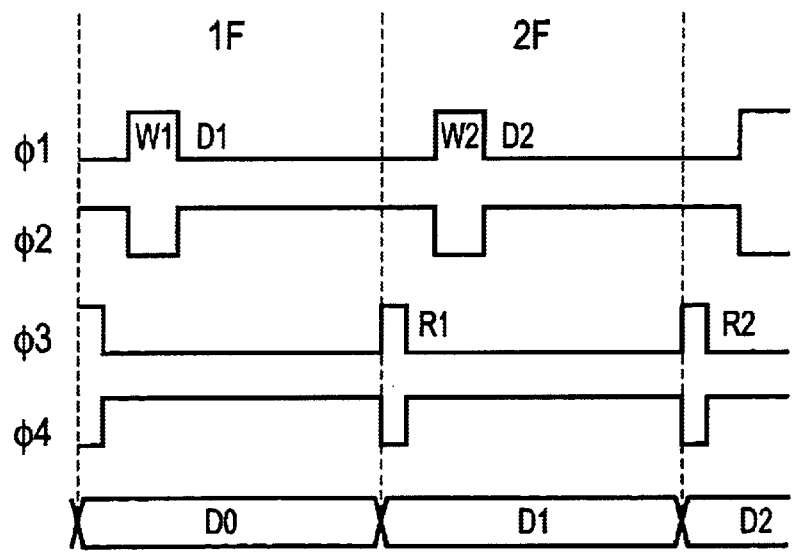
FIG. 15(B) is a timing chart explaining the operation of the digital storage circuit of FIG. 15(A).
Figure 16:
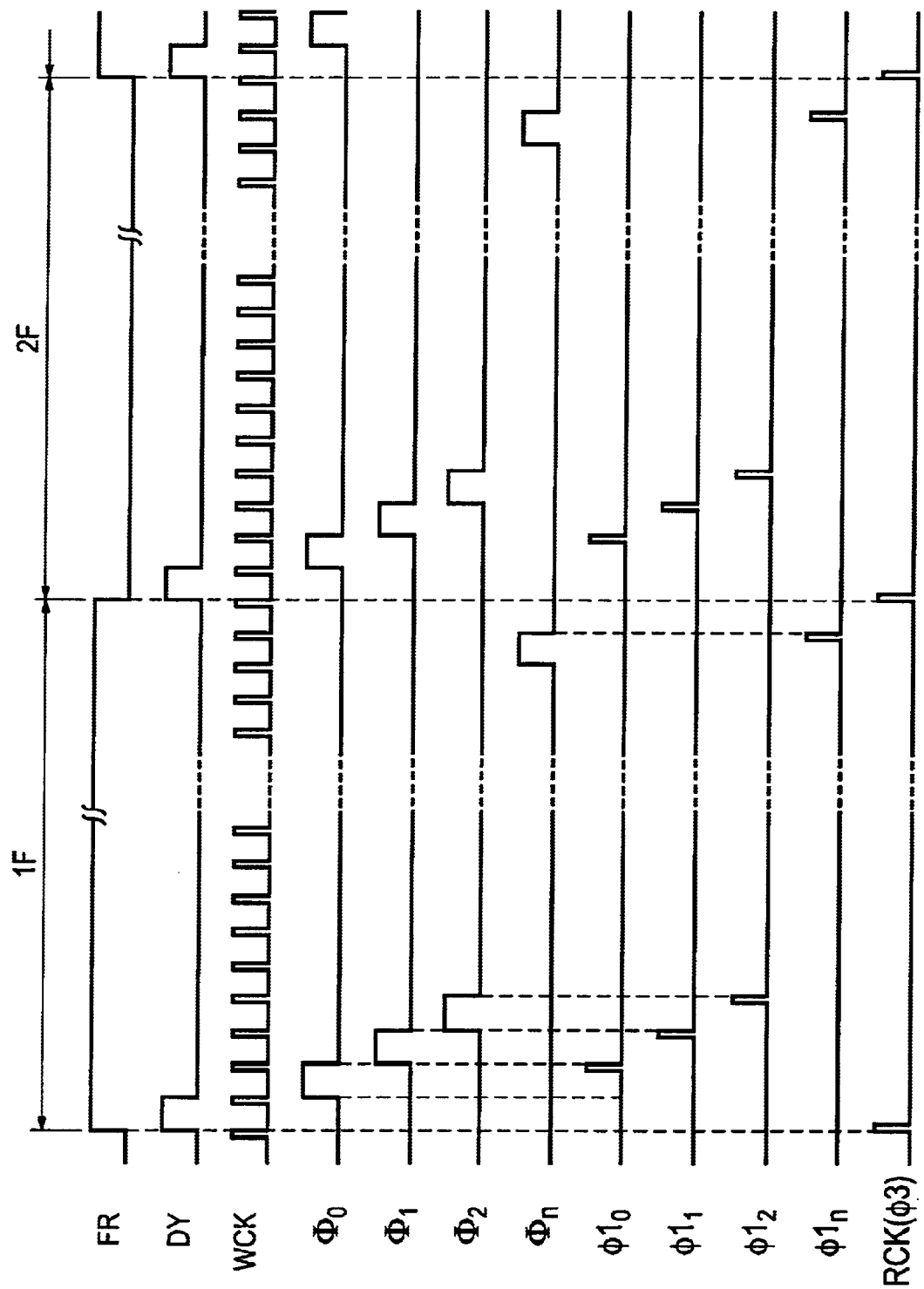
FIG. 16 is a timing chart explaining the general operation of the matrix liquid-crystal display element drive circuit of FIG. 14.

FIG. 14 is a circuit diagram showing a matrix liquid-crystal display element drive circuit arranged on the substrate of a reflective liquid-crystal display panel of a ninth embodiment of the present invention. FIG. 15(A) is a circuit diagram of a digital storage circuit arranged for each pixel in the matrix liquid-crystal display element drive circuit, and FIG. 15(B) is a timing chart explaining the operation of the digital storage circuit, and FIG. 16 is a timing chart explaining the general operation of the matrix liquid-crystal display element drive circuit.

In the following discussion, unless otherwise particularly noted, n and m is an arbitrary natural number, and the letters i and j are integers satisfying the conditions of $0 \leq i \leq n$ and $0 \leq j \leq m$.

Figure 19:
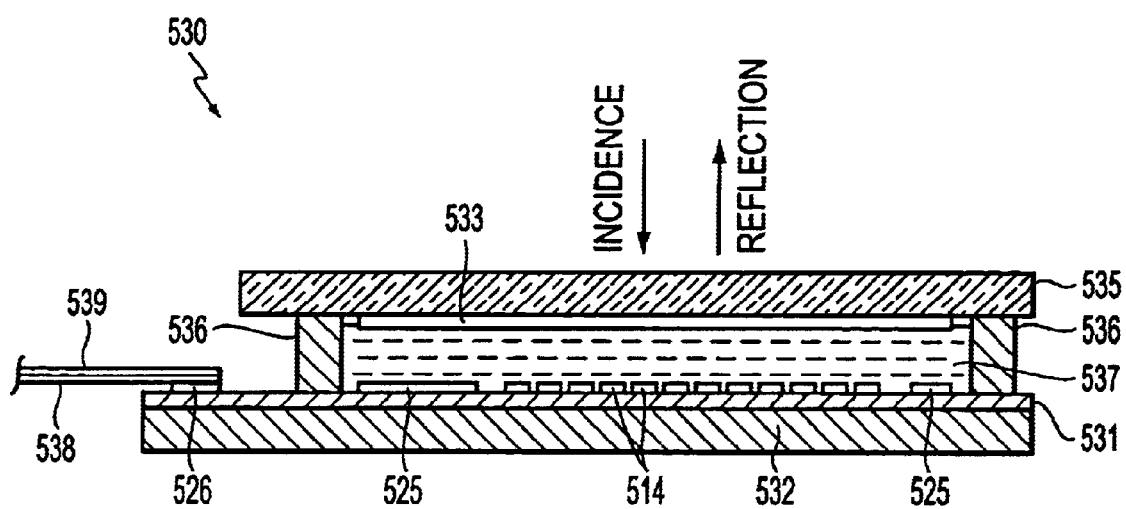
FIG. 19 is a cross-sectional view showing a reflective liquid-crystal display panel.
Figure 20:
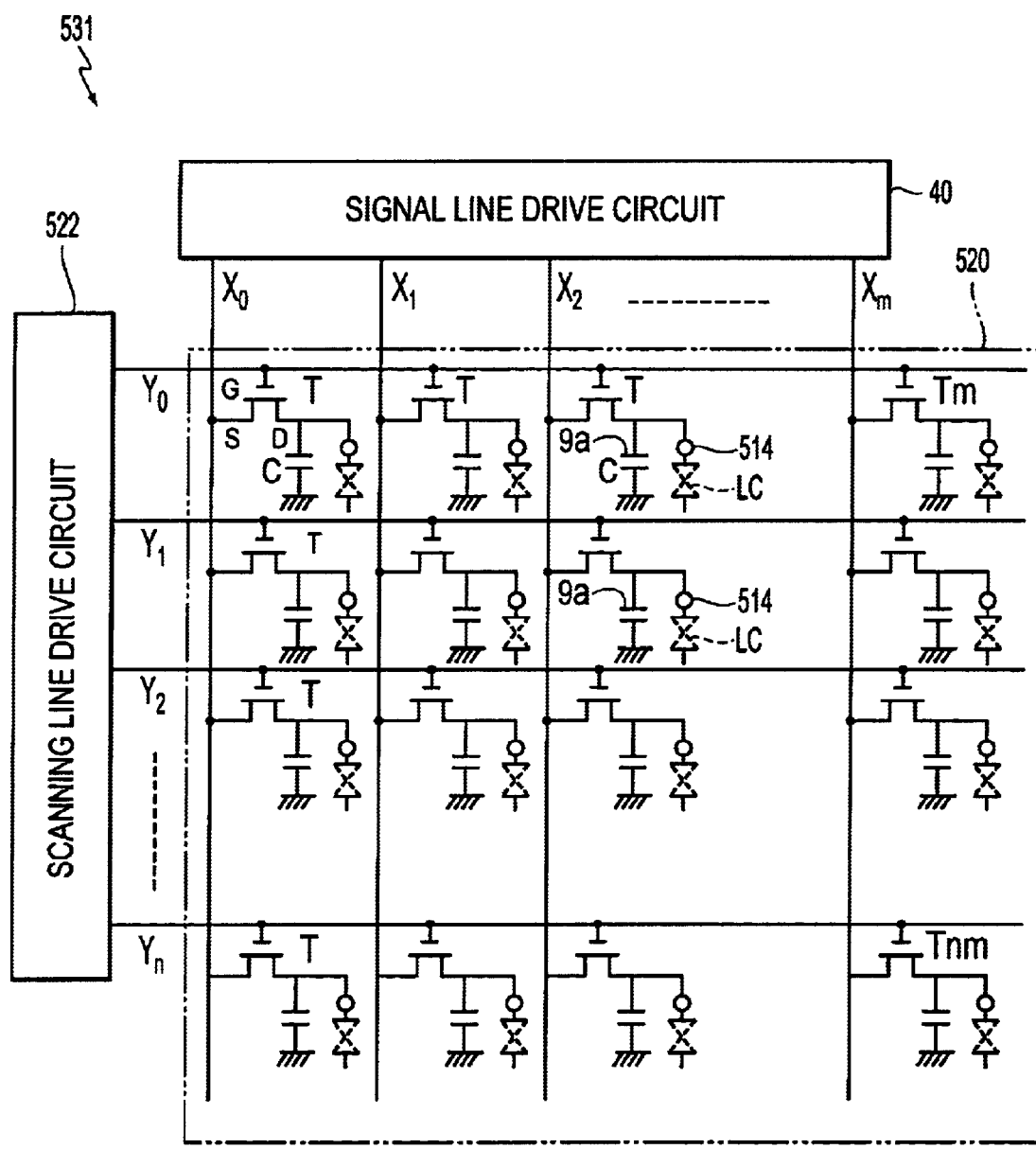
FIG. 20 is a circuit diagram showing an active-matrix liquid-crystal display element drive circuit for a conventional reflective liquid-crystal display panel substrate for use in a reflective liquid-crystal display panel.
Figure 21:
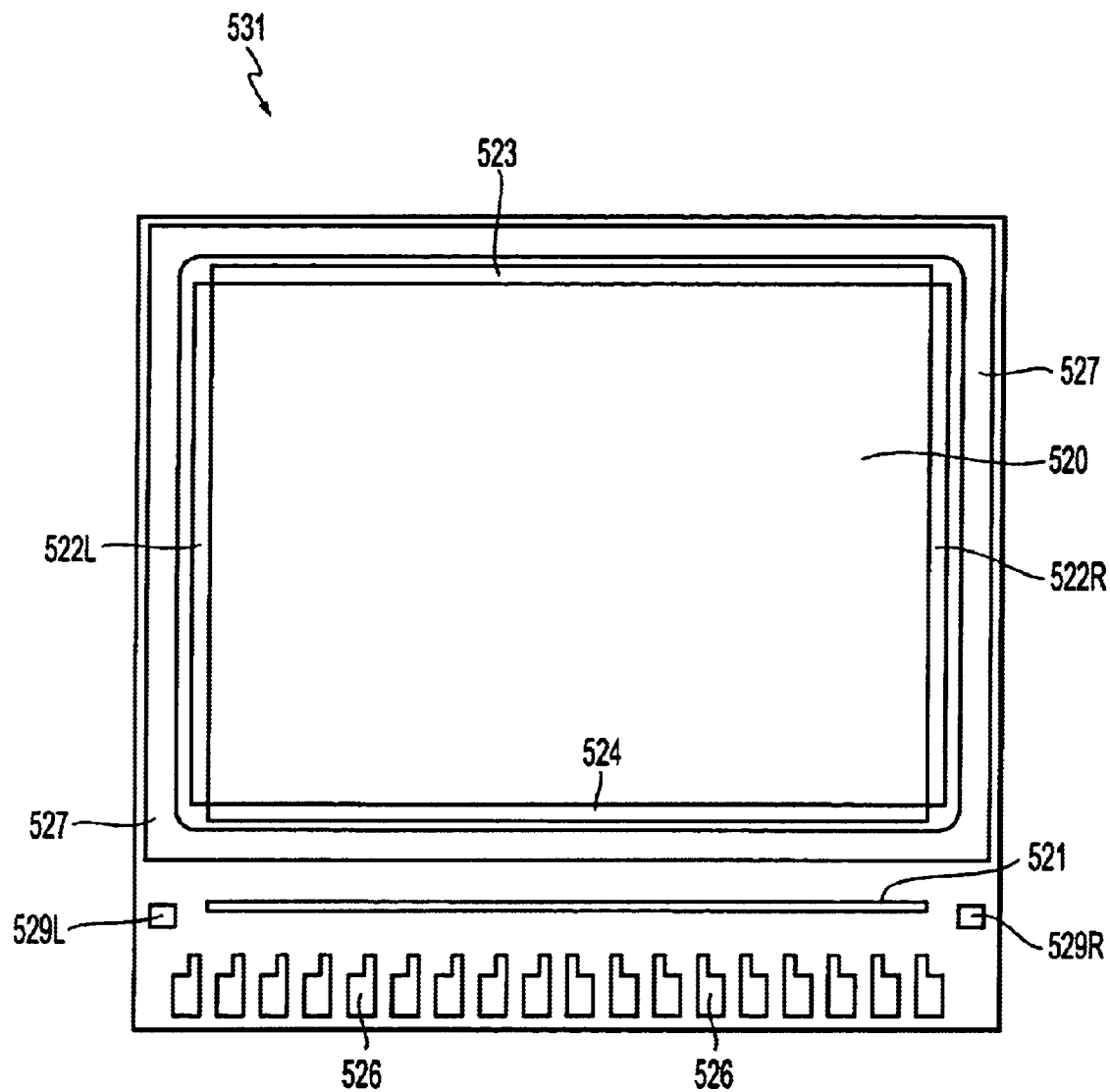
FIG. 21 is a plan view showing the reflective liquid-crystal display panel substrate of FIG. 20.
Figure 22:
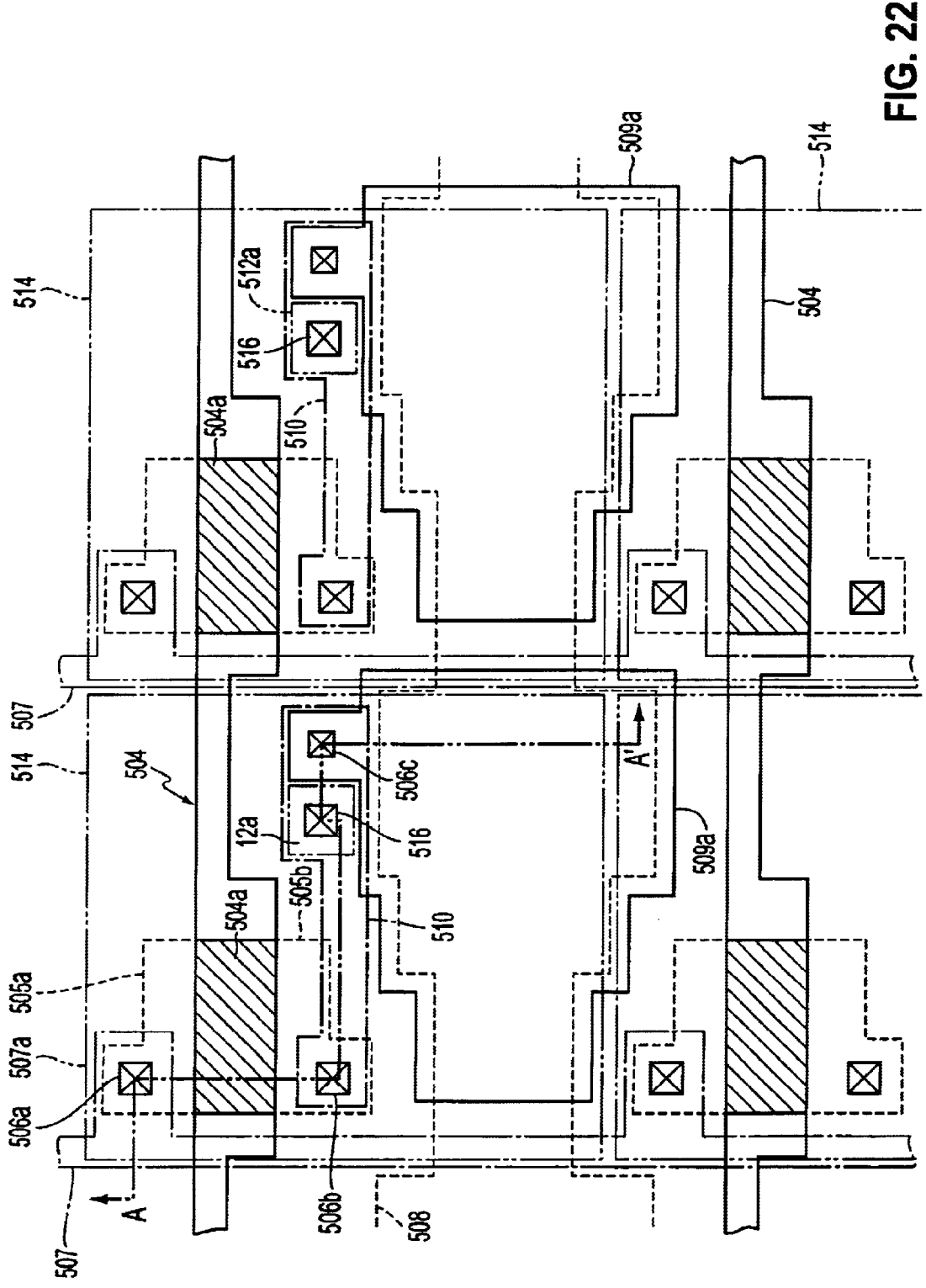
FIG. 22 is a plan view partly showing the pixel area of the reflective liquid-crystal display panel substrate of FIG. 21.
Figure 23:
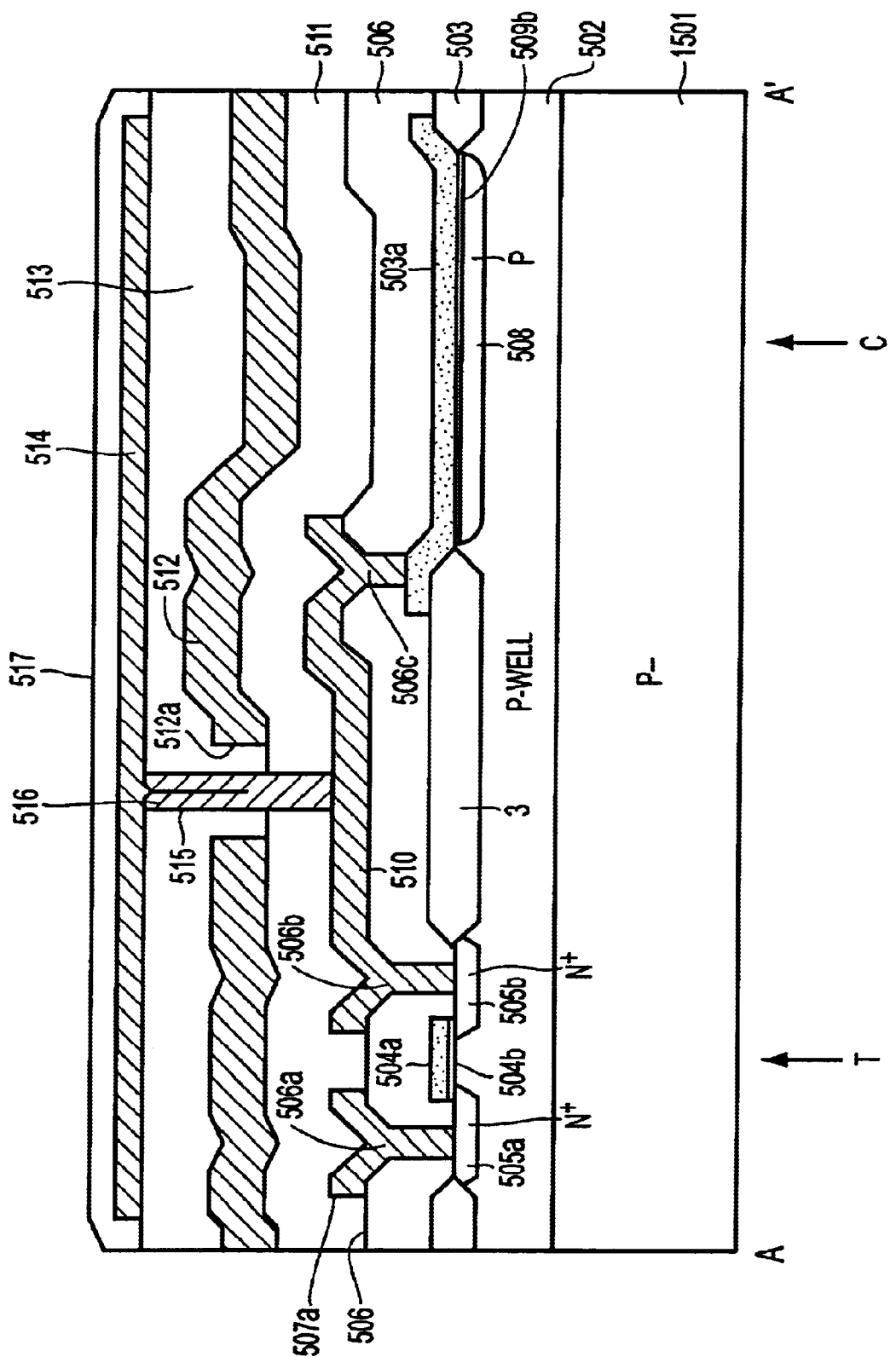
FIG. 23 is a cross-sectional view taken along line A–A' in FIG. 22.

As in the conventional panel substrate shown in FIG. 19 and FIG. 20, in the reflective liquid-crystal display panel substrate of this embodiment, active elements and capacitive elements are embedded in a major surface of a large-size monocrystal semiconductor substrate (as large as 20 mm by 20 mm, for example), interlayer insulators and electrically conductive layers are alternately deposited on these elements, and a matrix of large number of rectangular pixels (reflective electrodes) 114 (see FIG. 15(A)) are arranged in a pixel area that occupies a major portion of the area of the substrate in a plan view.

A matrix liquid-crystal display element drive circuit 150 shown in FIG. 14 includes an active matrix circuit 151 embedded right beneath the pixel area of the semiconductor substrate, a serial-to-parallel converting shift register (a signal electrode drive circuit, an X driver) 152 for successively sending incoming display data signal (Data) to signal electrodes (X) $X_1$–$X_m$, each for a column of pixels in the active matrix circuit 151, in a line-at-a-time manner, a scanning line drive circuit (a Y driver) 153 for successively sending a latch control signal (a write timing signal) to digital storage circuits M ($M_{00}$–$M_{nm}$) each for one pixel of the matrix circuit 151, row by row, through two lines of scanning line electrodes $Y_1$ ($Y_{10}$–$Y_{1n}$) and $Y_2$ ($Y_{20}$–$Y_{2n}$), and two lines of scanning electrodes $Y_3$ ($Y_{30}$–$Y_{2n}$) and $Y_4$ ($Y_{40}$–$Y_{4n}$), for each pixel row, for sending a second timing pulse (a positive-phase-sequence read clock pulse RCK ($\phi3$) and a negative-phase-sequence read clock pulse RCK bar ($\phi4$)) to concurrently drive the pixel electrodes 114. The serial-to-parallel converting shift register 152 and the scanning electrode drive circuit 153 are peripheral circuits external to the matrix circuit 151 in the center of the pixel area.

The serial-to-parallel converting shift register 152 shifts display digital data (DATA=$D_m$–$D_0$) for pixel columns in synchronization with the shift clock CLX, outputting pixel data $D_0$–$D_m$ for the signal electrodes $X_0$–$X_m$ every horizontal period. The scanning electrode drive circuit 153 includes a scanning electrode shift register (Y shift register) 153*a* that shifts a scanning start pulse (a frame start pulse) DY in synchronization with the shift clock CLY, thereby successively generating row drive timing pulses $\Phi_0$–$\Phi_n$ on the pixels every vertical period, and a latch timing circuit 153*b* for generating first timing pulses (a positive-phase-sequence latch control pulse φ1i and a negative-phase-sequence latch control pulse φ2i) respectively for the scanning electrodes $Y_1$ and $Y_2$ in accordance with the row drive timing pulses $\Phi_0$–$\Phi_n$ and a write clock pulse WCK. As already discussed, i is an integer satisfying the condition of $0 \leq i \leq n$.

The latch timing circuit 153*b* includes logical circuits $G_{0-Gn}$, which output the logical AND of the row drive timing pulses $\Phi_0$–$\Phi_n$ for the respective rows of pixels and the write clock pulse WCK, as the positive-phase-sequence latch control pulse φ1i, to the first scanning electrode $Y_{1i}$, while outputting the inverted version of the logical AND output φ1i, as the negative-phase-sequence latch control pulse φ2i, to the second scanning electrode $Y_{2i}$.

The matrix circuit 151 includes a digital storage circuit M ($M_{00}$–$M_{nm}$) embedded at a pixel at each of the intersections of the signal electrodes X extending in the direction of columns and the scanning electrodes Y extending in the direction of rows arranged in a matrix configuration as shown in FIG. 15(A). The digital storage circuit M includes a first latch circuit L1 and a second latch circuit L2. The first latch circuit L1 has a data input D to which digital data $D_j$ fed to a signal electrode $X_j$ is applied, and a storage output Q for applying a drive voltage to a pixel electrode 114 that holds a liquid crystal 137 against a common electrode 133 on an opposing substrate (not shown). The first latch circuit L1 captures and temporarily stores the digital data $D_j$ coming to the signal electrode $X_j$ during a prior frame period (an odd frame period, for instance). The second latch circuit L2 reads and temporarily stores the digital data $D_j$, temporarily stored in the first latch circuit L1, during a subsequent frame period (an even frame period, for example), before the latch operation of the first latch circuit L1, while giving an output to the storage output Q thereof. As shown in FIG. 14 and FIG. 15(A), Vcom is a common voltage applied to a common electrode 133 of the opposing substrate (not shown).

The first latch circuit L1 includes a first data-transfer N-channel MOSFET ($T_1$) that captures the digital data in synchronization with a positive-phase-sequence latch control pulse φ1i on a first scanning electrode $Y_{1i}$, and a first synchronization flipflop F1 that temporarily stores the data, which has passed through the first data-transfer MOSFET ($T_1$), in synchronization with the disappearance of a negative-phase-sequence latch control pulse φ2i on a second scanning electrode $Y_{2i}$. The second latch circuit L2 includes a second data-transfer N-channel MOSFET ($T_2$) that captures the output data of the first synchronization flipflop F1 in synchronization with a positive-phase-sequence clock pulse RCK (φ3) on a third scanning electrode $Y_{3i}$, and a second synchronization flipflop F2 that temporarily stores the data, which has passed through the second data-transfer N-channel MOSFET ($T_2$), in synchronization with the disappearance of a negative-phase-sequence latch control pulse φ4 on a fourth scanning electrode $Y_{4i}$, while giving an output to the storage output Q thereof.

The first synchronization flipflop F1 includes a first double inverter circuit having two inverters INV1 and INV2 connected in a cascade configuration, and a first storage control N-channel MOSFET ($Q_1$) for temporarily disconnecting an electrical connection between the input of the initial-stage INV1 and the output of the feedback-stage INV2 in synchronization with the negative-phase-sequence latch control pulse φ2i. The second synchronization flipflop F2 includes a second double inverter circuit having two inverters NV3 and INV4 connected in a cascade configuration, and a second storage control MOSFET ($Q_2$) for temporarily disconnecting an electrical connection between the input of the initial-stage inverter INV3 and the output of the feedback-stage inverter INV4 in synchronization with the negative-phase-sequence timing pulse φ4.

When the liquid crystal AC driving signal FR, which alternates every frame, rises during the odd frame period 1F as shown in FIG. 16, the positive-phase sequence read timing pulse RCK (φ3) is generated on the third scanning electrodes $Y_{30}$–$Y_{3n}$ in synchronization with the rising edge of the liquid crystal AC driving signal FR, while the negative-phase-sequence read timing pulse RCK (φ4) is generated on the fourth scanning electrodes $Y_{40}$–$Y_{4n}$. At the moment the AC driving signal FR rises, the scanning start pulse DY is added to the scanning electrode shift register 153*a*. The row drive timing pulses $\Phi_0$–$\Phi_n$ are successively generated in synchronization with the shift clock CLY that is generated at regular intervals, while the write clock pulse WCK is also generated in synchronization with the shift clock CLY. For this reason, the positive-phase-sequence latch control pulses φ$1_0$–φ$1_n$ (φ1i) are generated on the first scanning electrodes $Y_{10}$–$Y_{1n}$, while the negative-phase-sequence latch control pulses φ$2_0$–φ$2_n$ (φ2i) are generated on the second scanning electrodes $Y_{20}$–$Y_{2n}$.

The pulses φ1i, φ2i, φ3, and φ4 are thus generated on the first through fourth scanning electrodes $Y_{1i}$–$Y_{4i}$ in the sequence shown in FIG. 15(B). When the latch control pulses φ1i and φ2i are generated on the first scanning electrodes $Y_{1i}$ and the second scanning electrode $Y_{2i}$ during a write period W1 of the prior frame period (the odd frame period, for instance) 1F, the output of the feedback inverter INV2 is not fed back to the initial-stage inverter INV1 in the first synchronization flipflop F1 because the first data-transfer MOSFET ($T_1$) is turned on and the first storage control MOSFET ($Q_1$) is turned off. The logical value of the prior data D1 from the first data-transfer MOSFET ($T_1$) is applied to the initial-stage inverter INV1, and an inverted logical value thereof appears on the output of the initial-stage inverter INV1. When the latch control pulses φ1i and φ2i disappear, ending the write period W1, the first data-transfer MOSFET ($T_1$) is turned off while the first storage control MOSFET ($Q_1$) is turned on. The output of the feedback-stage inverter INV2 is fed back to the initial-stage inverter INV1. The first synchronization flipflop F1 thus resumes the storage operation, and the prior data D1 is temporarily stored in the first synchronization flipflop F1.

When the read clock pulses φ3 and φ4 are generated on the third scanning electrodes $Y_{3i}$ and the fourth scanning electrodes $Y_{4i}$ during a read period R1 of the subsequent frame period (the even frame period, for instance) 2F, the output of the feedback inverter INV4 is not fed back to the initial-stage inverter INV3 in the second synchronization flipflop F2 because the second data-transfer storage control MOSFET ($T_2$) is turned on while the second storage control MOSFET ($Q_2$) is turned off. An inverted logical value of the prior data D1 from the first synchronization flipflop F1 is applied to the initial-stage inverter INV3, and a further inverted value of the input thereof, namely, the logical value of the data D1, appears on the output of the initial-stage inverter INV3. When the read clock pulses φ3 and φ4 disappear, ending the read period R1, the second data-transfer MOSFET ($T_2$) is turned off while the second storage control MOSFET ($Q_2$) is turned on. The output of the feedback inverter INV4 is fed back to the initial-stage inverter INV3. The second synchronization flipflop F2 thus resumes the storage operation, the prior data D1 is temporarily stored in the second synchronization flipflop F2, and the storage output Q is continuously fed to the pixel electrode 114. When the latch control pulses φ1i and φ2i are generated on the first scanning electrodes $Y_{1i}$ and the second scanning electrodes $Y_{2i}$ during a write period W2, subsequent data D2 overwrites the stored content of the first synchronization flipflop F1 in the same manner as already described.

The embodiment adopts the line-at-a-time scanning method. The sequence of writing controls the first synchronization flipflop F1, and does not affect the sequence of writing of the second synchronization flipflop F2. For this reason, frame switching is performed on all pixels, and the non-uniformity on the display screen is eliminated. A large-size display screen or high-definition display screen results regardless of the number of pixels. Since the concurrent still image display of the prior frame is presented on all pixels during the write operation of the subsequent frame, the display time and the write time are not exclusive to each other within one frame period, and the display time is allowed to be longer than that in the conventional art. A higher definition display is thus provided. Since longer write time is permitted, a slow signal transfer speed of the display data DATA works, thereby simplifying the construction of the peripheral circuit. A frame memory for display data attached external to the electrooptical device substrate is dispensed with. A high number of pixels may be used in the reflective liquid-crystal display panel substrate.

The second flipflop F2 of this embodiment functions as a driver which performs static driving on the pixel electrode 14. Unlike the dynamic driving, the pixel drive signal is free from attenuation and a perfect digital driving becomes possible.

The first data-transfer MOSFET ($T_1$) and the first storage control MOSFET ($T_2$) operate to be on/off in an exclusive manner to each other, and the second data-transfer MOSFET ($T_2$) and the second storage control MOSFET ($Q_2$) operate to be on/off in an exclusive manner to each other. The first data-transfer MOSFET ($T_1$) and the first storage control MOSFET ($T_2$) are arranged to be complementary to each other in semiconductor type, and the second data-transfer MOSFET ($T_2$) and the second storage control MOSFET ($Q_2$) are arranged to be complementary to each other in semiconductor type. This arrangement makes it unnecessary to send both the positive-phase pulse and the negative-phase pulse to the digital storage circuit M, thereby eliminating two lines of the scanning electrodes.

Tenth Embodiment

Figure 17:
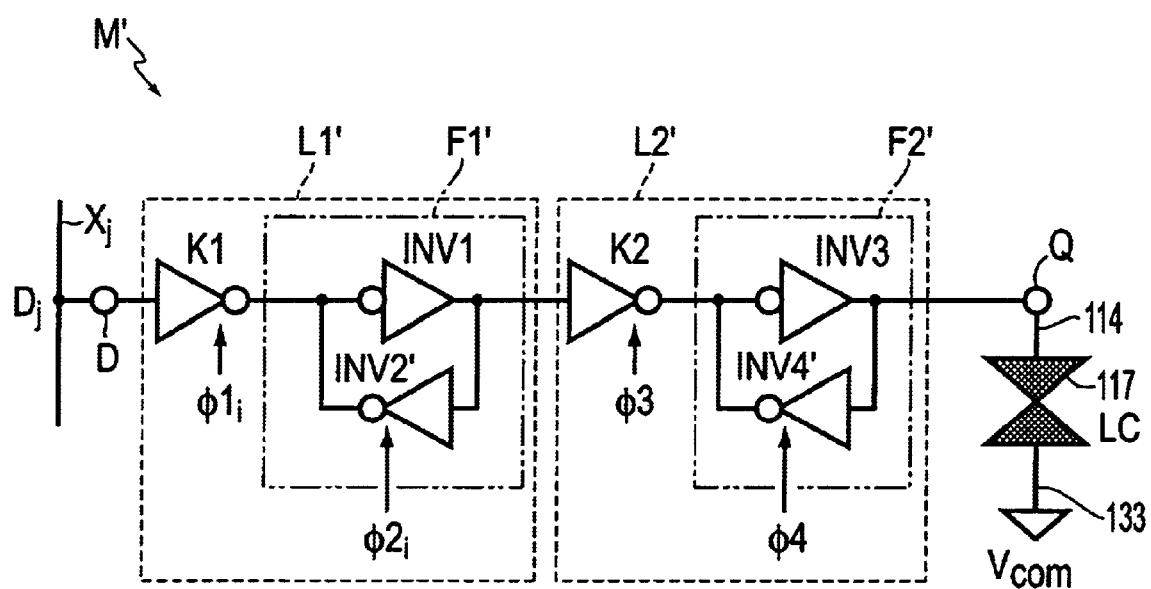
FIG. 17 is a circuit diagram showing a digital storage circuit of a tenth embodiment of the present invention.
Figure 18:
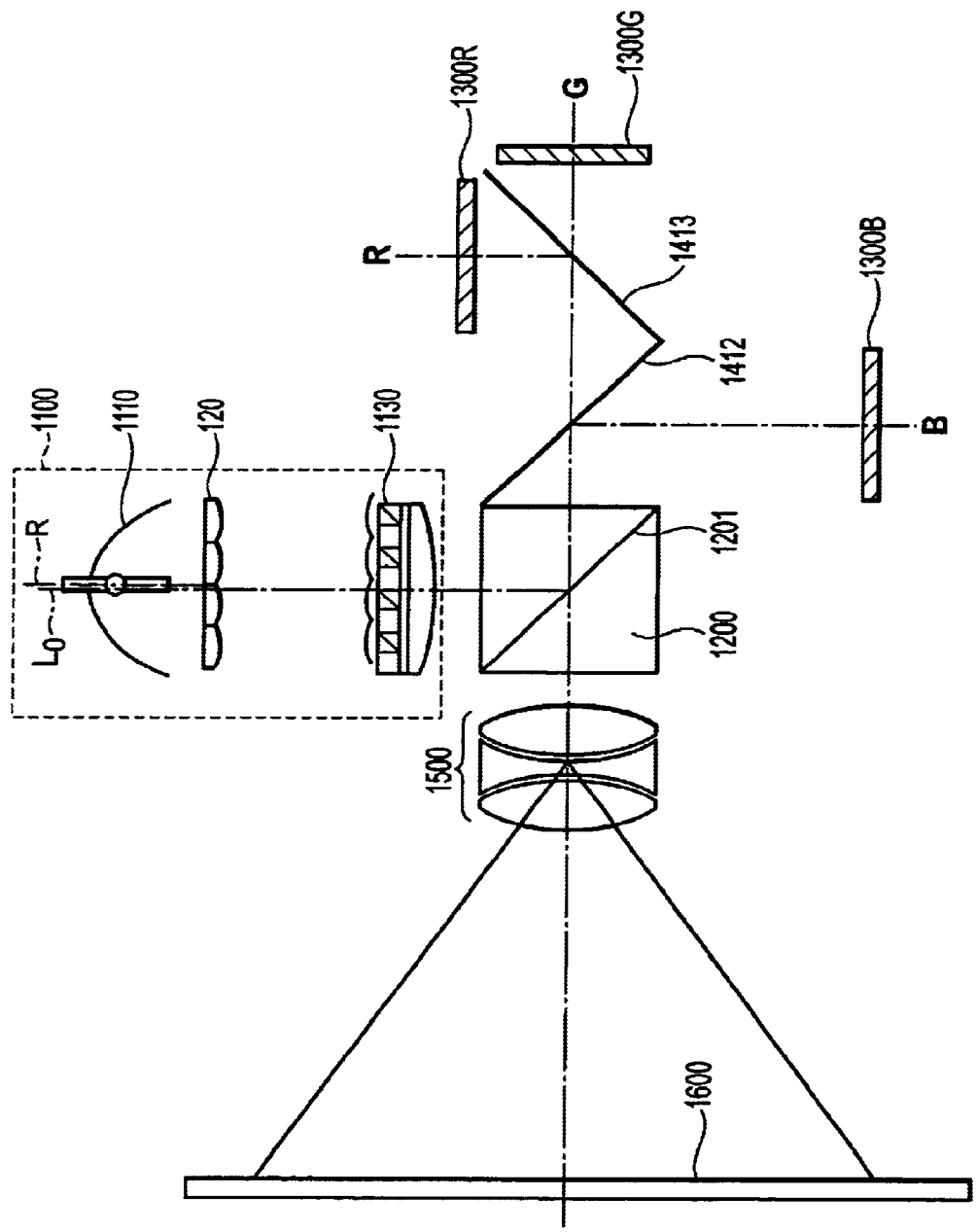
FIG. 18 is a block diagram generally showing a video projector as one example of a projection display apparatus that employs the reflective liquid-crystal display panel as a light valve.

FIG. 17 is a circuit diagram showing another digital storage circuit. In FIG. 17, components identical to those in connection with the first embodiment are designated with the same reference numerals, and the discussion thereabout is omitted here.

As in the conventional panel substrate shown in FIG. 19 and FIG. 20, in the reflective liquid-crystal display panel substrate of this embodiment, active elements and capacitive elements are embedded in a major surface of a large-size monocrystal semiconductor substrate (as large as 20 mm by 20 mm, for example), interlayer insulators and electrically conductive layers are alternately deposited on these elements, and a matrix of large number of rectangular pixels (reflective electrodes) 114 are arranged in a pixel area that occupies a major portion of the area of the substrate in a plan view. This embodiment includes a serial-to-parallel converting shift register 152 and a scanning electrode drive circuit 153 similar to those in the first embodiment, but the construction of a digital storage circuit M' thereof is different from the digital storage circuit M in the first embodiment.

The digital storage circuit M' includes a first latch circuit L1' and a second latch circuit L2'. The first latch circuit L1' has a data input D to which digital data $D_j$ fed to a signal electrode $X_j$ is applied, and a storage output Q for applying a drive voltage to a pixel electrode 114 that holds a liquid crystal 37 against a common electrode 33. The first latch circuit L1' captures and temporarily stores the digital data $D_j$ coming to the signal electrode $X_j$ during a prior frame period (an odd frame period, for instance). The second latch circuit L2' reads and temporarily stores the digital data $D_j$, temporarily stored in the first latch circuit L1, during a subsequent frame period (an even frame period, for example), before the latch operation of the first latch circuit L1, while giving an output to the storage output Q thereof.

The first latch circuit L1' includes a first clocked inverter K1 that receives the digital data Dj and performs a logic operation in synchronization with a positive-phase-sequence latch control signal φ1i on a first scanning electrode Y1i, and a first synchronization flipflop F1' that temporarily stores output data of the first clocked inverter K1 in synchronization with the disappearance of a negative-phase-sequence latch control pulse φ2i on a second scanning electrode $Y_{2i}$. The second latch circuit L2' includes a clocked inverter K2 that receives output data of the first synchronization flipflop F1 and performs a logic operation in synchronization with a positive-phase-sequence clock pulse RCK (φ3) on a third scanning electrode $Y_{3i}$, and a second synchronization flipflop F2' that temporarily stores output data of the clocked inverter K2 in synchronization with the disappearance of a negative-phase-sequence latch control pulse RCK bar (φ4) on a fourth scanning electrode $Y_{4i}$, while giving an output to the storage output Q thereof.

The first synchronization flipflop F1' is a first double inverter circuit having two inverters INV1 and INV2' connected in a cascade configuration, and the feedback-stage inverter INV2' is a clocked inverter that suspends the logic operation in synchronization with the negative-phase-sequence latch control pulse φ2i. The second synchronization flipflop F2' is a second double inverter circuit having two inverters INV3 and INV4' connected in a cascade configuration, and the feedback-stage INV4' is a clocked inverter that suspends the logic operation in synchronization with the negative-phase-sequence read clock pulse φ4.

When the latch control pulses φ1i and φ2i are generated on the first scanning electrodes $Y_{1i}$ and the second scanning electrode $Y_{2i}$ during a write period W1 of the prior frame period (the odd frame period, for instance) 1F as shown in FIG. 15(B), the output of the feedback inverter INV2' is not fed back to the initial-stage inverter INV1 in the first synchronization flipflop F1' because the first clocked inverter K1 performs the logic operation and the feedback inverter INV2' suspends the logic operation. The logical value of the prior data D1 from the first clocked inverter K1 is applied to the initial-stage inverter INV1, and an inverted logical value thereof appears on the output of the initial-stage inverter INV1. When the latch control pulses φ1i and φ2i disappear, ending the write period W1, the first clocked inverter K1 suspends the logic operation while the feedback inverter INV2' performs the logic operation. The output of the feedback-stage inverter INV2' is fed back to the initial-stage inverter INV 1. The first synchronization flipflop F1' thus resumes the storage operation, and the prior data D1 is temporarily stored in the first synchronization flipflop F1'.

When the read clock pulses $\phi3$ and $\phi4$ are generated on the third scanning electrodes $Y_{3i}$ and the fourth scanning electrodes $Y_{4i}$ during a read period R1 of the subsequent frame period (the even frame period, for instance) 2F, the output of the feedback inverter INV4' is not fed back to the initial-stage inverter INV3 in the second synchronization flipflop F2' because the second clocked inverter K1 performs the logic operation while the feedback-stage inverter INV4' suspends the logic operation. A logical value of the prior data D1 from the first synchronization flipflop F1 ' is applied to the initial-stage inverter INV3, and an inverted value thereof appears on the output of the initial-stage inverter INV3. When the read clock pulses $\phi3$ and $\phi4$ disappear, ending the read period R1, the second clocked inverter K1 suspends logic operation while the feedback-stage inverter INV4' performs the logic operation. The output of the feedback inverter INV4' is fed back to the initial-stage inverter INV4. The second synchronization flipflop F2' thus resumes the storage operation, and the prior data D1 is temporarily stored in the second synchronization flipflop F2', and the storage output Q is continuously fed to the pixel electrode 114. When the latch control pulses $\phi1i$ and $\phi2i$ are generated on the first scanning electrodes $Y_{1i}$ and the second scanning electrodes $Y_{2i}$ during a write period W2, subsequent data D2 overwrites the stored content of the first synchronization flipflop F1' in the same manner as already described.

This embodiment also has the same advantages as those of the first embodiment.

Since the digital storage circuit M' of this embodiment employs a clocked inverter, this arrangement is effective in the reduction of power consumption, wave shaping, and energy amplification, and helps assure that the storage operation be reliably performed. A three-state buffer may be substituted for the clocked inverters K1 and K2.

In the first through fifth embodiments, the opposing electrode (common electrode) 133 on the transparent substrate side, assembled to be opposed to the reflective liquid-crystal display panel substrate, is maintained to a constant voltage. In this embodiment, a relatively high voltage (liquid crystal AC driving signal FR), which alternates every frame, is applied to the opposing electrode.

By alternating or swinging the common voltage Vcom of the opposing electrode 33 every frame, the degradation of the liquid-crystal cell LC is prevented, and the logical amplitude of the signal applied to the pixel electrode 114 is relatively reduced. The active elements forming the digital storage circuit M (M') can be fabricated of low withstand-voltage ones. This permits fine structured elements to be implemented, leading to a reduced area size of the element. A high-definition display apparatus with an increased aperture ratio thus results.

The liquid-crystal display panels of the preceding embodiments are appropriate for use as a reflective liquid-crystal display panel. The liquid-crystal display panel may be incorporated not only in the light modulator element of the already described liquid-crystal projector, but also in the display unit for a portable information processing apparatus such as wrist-watch type electronic equipment, a wordprocessor, or a personal computer, the display unit for a portable telephone, and the display units for a diversity of electronic equipment.

In the liquid-crystal display panels of the preceding embodiments, the switching elements are embedded in the major surface of the semiconductor substrate. The substrate is not limited to the semiconductor substrate, and may be an insulator substrate such as a glass substrate or a quartz substrate. The present invention may be implemented when a thin-film transistor (TFT) is formed on the insulator substrate as a switching element.

The present invention finds use not only in the liquid-crystal display panel substrate but also in other flat display substrates.

As described above, the present invention includes the digital storage means for each pixel at each intersection of the scanning electrodes and the signal electrodes arranged in a matrix configuration in the electrooptical device substrate. The digital storage means performs concurrently in parallel both the pixel driving operation based on the prior digital data that is temporarily stored and the temporary storage operation for the subsequent digital data for the same pixel that comes in to the signal electrode a constant duration after the prior signal. The following advantages are therefore provided.

(1) The sequence of the writing of the digital data is not directly pronounced as the sequence of pixel driving, and the concurrence of the switching of the frame for all pixels and the display of all pixels is assured. The problem of the non-uniformity on the display screen is resolved, and a high image quality electrooptical device substrate is thus provided. A large-size display screen or high-definition display screen results regardless of the number of pixels. Since the display time and the write time are not exclusive to each other during one frame period, the display time is allowed to be longer than that in the conventional art. A higher definition display is thus provided. Since the delayed pixel driving type active element circuit performs the temporary storage operation of the subsequent signal during the pixel driving period for the prior signal, the temporary storage operation for all pixels for the constant duration (one frame period, for instance) is achieved, permitting longer write time. With a slow signal transfer speed, the peripheral circuits are simplified in construction or modified to accommodate a higher number of pixels. A frame memory for display data attached external to the electrooptical device substrate is dispensed with.

In accordance with the present invention, the pixel driving method is a static driving method based on the temporarily stored data, rather than a dynamic driving, and the pixel drive signal is free from attenuation and a perfect digital driving becomes possible.

(2) The present invention includes the digital storage means for each pixel at each intersection of the scanning electrodes and the signal electrodes arranged in a matrix configuration in the electrooptical device substrate. The digital storage means temporarily stores the digital data, coming in to the signal electrode, in the plurality of the cascaded storage cells while successively shifting the digital data therealong, and drives the pixels in response to the storage output of the last-stage storage cell. With this digital storage means, the storage cell for driving the pixel electrode in a static manner is the last-stage storage cell, and a perfect digital driving becomes possible.

INDUSTRIAL APPLICABILITY

The present invention provides a substrate for an electrooptical device which presents a high image-quality display screen free from screen non-uniformity. A large-size display screen or high-definition display screen results regardless of the number of pixels.

What is claimed is:

1. A substrate comprising:
   a signal electrode;
   a first sample-and-hold circuit electrically coupled to the signal electrode;
   a second sample-and-hold circuit electrically coupled to the signal electrode;
   a pixel drive circuit; and
   an electrode electrically coupled to the pixel drive circuit,
   when a signal of an (N+1)-th image is applied to the signal electrode, the pixel drive circuit applying a voltage to the electrode within a first duration of time in response to a signal of an N-th image stored in the first sample-and-hold circuit, and the second sample-and-hold circuit storing the signal of the (N−1)-th image within the first duration of time, and
   when a signal of an (N+2)-th image is applied to the signal electrode, the pixel drive circuit applying a voltage to the electrode within a second duration of time in response to the signal of the (N+1)-th image stored in the second sample-and-hold circuit, and the first sample-and-hold circuit storing the signal of the (N+2)-th image within the second duration of time, N being a natural number.

2. The substrate according to claim 1, further comprising:
   a first scanning electrode to which a first write timing signal is applied; and
   a second scanning electrode to which a second write timing signal is applied, the first sample-and-hold circuit comprising:
     a first signal hold circuit, and
     a first signal writing circuit electrically coupled to the first scanning electrode;
   the second sample-and-hold circuit comprising:
     a second signal hold circuit; and
     a second signal writing circuit electrically coupled to the second scanning electrode,
   the first signal writing circuit electrically connecting the signal electrode to the first signal hold circuit in response to the first write timing signal, and
   the second signal writing circuit electrically connecting the signal electrode to the second signal hold circuit in response to the second write timing signal.

3. The substrate according to claim 2, the first signal writing circuit being a first writing transistor, and
   the second signal writing circuit being a second writing transistor having a same semiconductor type as that of the first writing transistor.

4. The substrate according to claim 2, the first signal writing circuit being a first writing transistor; and
   the second signal writing circuit being a second writing transistor having a semiconductor type complementary to that of the first writing transistor.

5. The substrate according to claim 2, further comprising:
   a scanning electrode drive circuit that outputs a scanning electrode drive wave; and
   a write timing circuit that receives the scanning electrode drive wave and a timing signal that alternates in level every frame period,
   in response to the scanning electrode drive wave and the timing signal, the write timing circuit applying the first write timing signal to the first scanning electrode within an odd frame period and applying the second write timing signal to the second scanning electrode within an even frame period.

6. The substrate according to claim 2, further comprising:
   an odd-frame scanning electrode drive circuit that applies the first write timing signal to the first scanning electrode within an odd frame period; and
   an even-frame scanning electrode drive circuit that applies the second write timing signal to the second scanning electrode within an even frame period.

7. The substrate according to claim 1, the pixel drive circuit comprising:
   a first signal reading circuit;
   a second signal reading circuit; and
   a common pixel drive circuit,
   the first signal reading circuit electrically connecting the first sample-and-hold circuit to the common pixel drive circuit in response to a first read timing signal,
   the second signal reading circuit electrically connecting the second signal hold circuit to the common pixel drive circuit in response to a second read timing signal, and
   the common pixel drive circuit driving a pixel in response to a signal from one of the first reading circuit and the second reading circuit.

8. The substrate according to claim 7, the first reading circuit being a first reading transistor; and
   the first reading circuit being a second reading transistor having a same semiconductor type as that of the first reading transistor.

9. The substrate according to claim 8, the common pixel drive circuit being a drive transistor;
   one terminal of the drive transistor being electrically connected to a pixel drive power source, and another terminal of the drive transistor being electrically connected to the electrode.

10. The substrate according to claim 9, the timing signal, which alternates in a level every frame period, being used as the first read timing signal within an odd frame and being used as the second read timing signal within an even frame.

11. The substrate according to claim 7, the first reading circuit being a first reading transistor;
    the first reading circuit being a second reading transistor having a semiconductor type complementary to that of the first reading transistor; and
    the first read timing signal and the second read timing signal being a same signal.

12. The substrate according to claim 11, the common pixel drive circuit being a pixel drive transistor;
    one terminal of the pixel drive transistor being electrically connected to a pixel drive power source, and another terminal of the pixel drive transistor being electrically connected to the electrode.

13. The substrate according to claim 7, further comprising:
    a read timing circuit that outputs the first read timing signal within an odd frame period and that outputs the second read timing signal within an even frame period, in response to a timing signal, a level of which alternates every frame period.

14. The substrate according to claim 13, the read timing circuit interposing a blanking period between the first read timing signal and the second read timing signal.

15. The substrate according to claim 1, the pixel drive circuit comprising:
    a first pixel drive circuit; and
    a second pixel drive circuit, the first pixel drive circuit electrically connecting the first sample-and-hold circuit to the electrode in response to the first read timing signal, and the second pixel drive circuit electrically connecting the second sample-and-hold circuit to the electrode in response to the second read timing signal.

16. The substrate according to claim 15, the first pixel drive circuit being a first drive transistor; and the second pixel drive circuit being a second drive transistor having a same semiconductor type as that of the first drive transistor.

17. The substrate according to claim 15, the first pixel drive circuit being a first drive transistor; and the second pixel drive circuit being a second drive transistor having a semiconductor type complementary to that of the first drive transistor.

18. The substrate according to claim 1, a signal applied to the signal electrode being an analog signal.

19. The substrate according to claim 1, a signal applied to the signal electrode being a pulse-width modulated signal.

20. An electrooptical device comprising:
   the substrate according to claim 1;
   a light-transmissive substrate opposing the substrate; and
   an electrooptical material interposed between the substrate and the light-transmissive substrate.

21. The electrooptical device according to claim 20, further comprising an opposing electrode mounted on the light-transmissive substrate,
   a common voltage, which alternates every frame period, being applied to the opposing electrode.

22. Electronic equipment comprising the electrooptical device according to claim 20, the electrooptical device being a display unit.

23. A projector comprising the electrooptical device according to claim 20, the electrooptical device being a light modulator unit.

24. A substrate comprising:
   a plurality of electrodes arranged in a matrix configuration; and
   a plurality of storage circuits respectively electrically coupled to the plurality of electrodes,
   each of the plurality of the storage circuits comprising:
      a first latch circuit, and
      a second latch circuit,
   the first latch circuit being electrically coupled to at least one first scanning line and a signal electrode,
   the second latch circuit being electrically coupled to at least one second scanning line, the first latch circuit, and the electrode,
   when the first latch circuit is supplied with a first timing signal through at least one first scanning line, the first latch circuit storing a data signal applied to the signal electrode until a next first timing signal being applied,
   when the second latch circuit is supplied with a second timing signal through at least one second scanning line, the second latch circuit receiving the data signal stored in the first latch circuit, and feeding the data signal to the pixel electrode until a next second timing signal being applied,
   the first timing signal being successively applied to all first latch circuits in a row in the matrix configuration, and
   the second timing signal being concurrently applied to all second latch circuits each time the first timing signal being applied to all first latch circuits in the row.

25. The substrate according to claim 24, the first latch circuit comprising:
   a first data selecting element that captures the data signal; and
   a first flipflop that stores the data signal captured through the first data selecting element,
   the second latch circuit comprising:
      a second data selecting element that captures the data signal stored in the first flipflop; and
      a second flipflop that stores the data signal captured through the second data selecting element, an output terminal of the second flipflop being electrically connected to the electrode.

26. The substrate according to claim 25, the first data selecting element being a first transistor that electrically connects the data signal line to the first flipflop in synchronization with the first timing signal,
   the first flipflop being a first synchronization flipflop that performs a storage operation in synchronization with the first timing signal,
   the second data selecting element being a second transistor that electrically connects the first flipflop to the second flipflop in synchronization with the second timing signal, and
   the second flipflop being a second synchronization flipflop that performs a storage operation in synchronization with the second timing signal.

27. The substrate according to claim 26, the first synchronization flipflop comprising:
   a first even-number inverter circuit having an even number of inverters connected in a cascade configuration, and
   a first storage control transistor that disconnects an electrical connection between an input of an initial-stage inverter and an output of a feedback inverter in the first even-number inverter circuit in synchronization with the first timing signal;
   the second synchronization flipflop comprising:
      a second even-number inverter circuit having an even number of inverters connected in a cascade configuration, and
      a second storage control transistor that disconnects an electrical connection between an input of an initial-stage inverter and an output of a feedback inverter in the second even-number inverter circuit in synchronization with the second timing signal.

28. The substrate according to claim 27, at least one of the first even-number inverter circuit and the second even-number inverter circuit being a double inverter circuit including two inverters.

29. The substrate according to claim 26, the first synchronization flipflop comprising:
   a first even-number inverter circuit having an even number of inverters connected in a cascade configuration;
   a feedback stage inverter in the first even-number inverter circuit being a first clocked inverter that suspends a logic operation in synchronization with the first timing signal;
   the second synchronization flipflop comprising:
      a second even-number inverter circuit having an even number of inverters connected in a cascade configuration, and
      a feedback stage inverter in the second even-number inverter circuit being a second clocked inverter that suspends a logic operation in synchronization with the second timing signal.

30. The substrate according to claim 25, the first data selecting element being a first one-input gating element that performs a logic operation in synchronization with the first timing signal, the first flipflop being a first synchronization flipflop that performs a storage operation in synchronization with the first timing signal, the second data selecting element being a second one-input gating element that performs a logic operation in synchronization with the second timing signal, and the second flipflop being a second synchronization flipflop that performs a storage operation in synchronization with the second timing signal.

31. The substrate according to claim 30, at least one of the first one-input gating element and the second one-input gating element being a clocked inverter.

32. The substrate according to claim 30, at least one of the first one-input gating element and the second one-input gating element being a three-state buffer.

33. The substrate according to claim 24, further comprising:

a serial-to-parallel converting shift register that applies digital data to the signal electrode;

a scanning electrode selecting shift register that successively selects scanning electrodes; and a latch timing circuit that generates the first timing signal in accordance with a scanning electrode drive wave from the scanning electrode selecting shift register.

34. An electrooptical device comprising:

the substrate according to claim 24 as a first substrate;

a light-transmissive substrate as a second substrate opposing the first substrate; and an electrooptical material interposed between the first substrate and the second substrate.

35. The electrooptical device according to claim 34, further comprising an opposing electrode mounted on the light-transmissive substrate, a common voltage which alternates every frame period being applied to the opposing electrode.

36. Electronic equipment comprising the electrooptical device according to claim 34, the electrooptical device a display unit.

37. A projector comprising the electrooptical device according to claim 34, the electrooptical device being a light modulator unit.

* * * * *